United States Patent
Walker et al.

(10) Patent No.: US 12,194,575 B2
(45) Date of Patent: Jan. 14, 2025

(54) PORTABLE BATTERY PACK-POWERED WELDER

(71) Applicant: MILWAUKEE ELECTRIC TOOL CORPORATION, Brookfield, WI (US)

(72) Inventors: Woodrow W. Walker, Milwaukee, WI (US); Andrew D. Van Hoorn, Menomonee Falls, WI (US); Matthew Doyle, Elm Grove, WI (US); Timothy J. Bartlett, Waukesha, WI (US); Timothy R. Obermann, Waukesha, WI (US); Steven C. Zbrozek, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 985 days.

(21) Appl. No.: 17/147,813

(22) Filed: Jan. 13, 2021

(65) Prior Publication Data
US 2021/0213553 A1    Jul. 15, 2021

Related U.S. Application Data

(60) Provisional application No. 62/960,423, filed on Jan. 13, 2020.

(51) Int. Cl.
*B23K 9/10* (2006.01)
*B23K 9/095* (2006.01)
(Continued)

(52) U.S. Cl.
CPC .......... *B23K 9/1062* (2013.01); *B23K 9/0953* (2013.01); *B23K 9/28* (2013.01); *B23K 9/32* (2013.01)

(58) Field of Classification Search
CPC ...... B23K 9/1062; B23K 9/0953; B23K 9/28; B23K 9/32; B23K 37/006; B23K 9/1081; B23K 9/173; B23K 9/1006
See application file for complete search history.

(56) References Cited

U.S. PATENT DOCUMENTS 2,866,076 A    12/1958  Aversten
3,129,352 A    4/1964   Adamson et al.
(Continued)

FOREIGN PATENT DOCUMENTS

CN    1045364 A    9/1990
CN    2181356 Y    11/1994
(Continued)

OTHER PUBLICATIONS

US 8,866,045 B2, 10/2014, Beeson et al. (withdrawn)
(Continued)

*Primary Examiner* — John P. Dulka
(74) *Attorney, Agent, or Firm* — Michael Best & Friedrich LLP

(57) ABSTRACT

A portable welder that includes a portable housing, a ground clamp, an electrode holder, a user interface, and a battery pack interface. The ground clamp is connected to the portable housing through a ground cable and is configured to be connected to a metal workpiece. The electrode holder is connected to the portable housing through an electrode cable. The electrode holder includes a mount connected to the electrode cable and a user input. The mount is configured to hold a consumable electrode. The user input is configured to activate the portable welder. The user interface located on the housing. The battery pack interface is configured to receive a removable and rechargeable battery pack.

18 Claims, 15 Drawing Sheets

(51) Int. Cl.
   *B23K 9/28* (2006.01)
   *B23K 9/32* (2006.01)

(56) References Cited

U.S. PATENT DOCUMENTS

| | | |
|---|---|---|
| 3,242,312 A | 3/1966 | Pierce |
| 3,448,239 A | 6/1969 | Hill |
| 3,657,512 A | 4/1972 | Bondarenko |
| 3,746,965 A | 7/1973 | Okada et al. |
| 3,883,714 A | 5/1975 | James |
| 4,216,367 A | 8/1980 | Risberg |
| 4,273,984 A | 6/1981 | Hara et al. |
| 4,301,355 A | 11/1981 | Kimbrough et al. |
| 4,442,339 A | 4/1984 | Mizuno et al. |
| 4,503,316 A | 3/1985 | Murase et al. |
| 4,507,542 A | 3/1985 | Kunz et al. |
| 4,521,672 A | 6/1985 | Fronius |
| 4,532,409 A | 7/1985 | Ogata et al. |
| 4,590,357 A | 5/1986 | Winkler |
| 4,785,159 A | 11/1988 | Hruska |
| 4,877,941 A | 10/1989 | Honma et al. |
| 4,916,289 A | 4/1990 | Suhanek |
| 4,947,021 A | 8/1990 | Stava |
| 5,086,208 A | 2/1992 | Habermann |
| 5,229,930 A | 7/1993 | Makimaa |
| 5,233,159 A | 8/1993 | Day |
| 5,250,786 A | 10/1993 | Kikuchi et al. |
| 5,298,712 A | 3/1994 | Alexandres |
| 5,406,050 A | 4/1995 | Macomber et al. |
| 5,446,641 A | 8/1995 | Reynolds et al. |
| 5,599,470 A | 2/1997 | Peotter et al. |
| 5,672,963 A | 9/1997 | Corrigall et al. |
| 5,710,696 A | 1/1998 | Reynolds et al. |
| 5,814,788 A | 9/1998 | Everhart et al. |
| 5,824,990 A | 10/1998 | Geissler et al. |
| 5,869,801 A | 2/1999 | Paton et al. |
| 5,911,894 A | 6/1999 | Colling |
| 5,942,139 A | 8/1999 | Moriguchi et al. |
| 5,991,180 A | 11/1999 | Vogel et al. |
| 6,005,220 A | 12/1999 | Bunker et al. |
| 6,075,225 A | 6/2000 | Heraly et al. |
| 6,087,628 A | 7/2000 | Ferkel et al. |
| 6,111,215 A | 8/2000 | Lilly |
| 6,114,655 A | 9/2000 | Reynolds |
| 6,137,080 A | 10/2000 | Borchardt et al. |
| 6,150,632 A | 11/2000 | Fisher |
| 6,204,479 B1 | 3/2001 | Sickels |
| 6,225,596 B1 | 5/2001 | Chandler et al. |
| 6,239,407 B1 | 5/2001 | Thommes |
| 6,278,081 B1 | 8/2001 | Reynolds |
| 6,291,798 B1 | 9/2001 | Stava |
| 6,303,894 B1 | 10/2001 | Laser et al. |
| 6,310,320 B1 | 10/2001 | Kraus et al. |
| 6,348,671 B1 | 2/2002 | Fosbinder et al. |
| 6,364,197 B1 | 4/2002 | Oelgoetz et al. |
| 6,472,635 B2 | 10/2002 | Trinkner et al. |
| 6,512,199 B1 | 1/2003 | Blazina |
| 6,713,721 B2 | 3/2004 | Albrecht |
| 6,747,246 B2 | 6/2004 | Crandell, III |
| 6,762,392 B1 | 7/2004 | Krengel et al. |
| 6,777,649 B2 | 8/2004 | Reynolds et al. |
| 6,797,922 B2 | 9/2004 | Katooka et al. |
| 6,812,584 B2 | 11/2004 | Renner |
| 6,818,860 B1 | 11/2004 | Stava et al. |
| 6,858,818 B2 | 2/2005 | Knoener |
| 6,930,280 B2 | 8/2005 | Zauner et al. |
| 6,933,466 B2 | 8/2005 | Hutchison |
| 6,933,467 B2 | 8/2005 | Hayes et al. |
| 7,045,742 B2 | 5/2006 | Feichtinger et al. |
| 7,087,860 B2 | 8/2006 | Nikodym et al. |
| 7,091,449 B2 | 8/2006 | Ihde et al. |
| 7,115,834 B2 | 10/2006 | Sykes et al. |
| 7,196,284 B2 | 3/2007 | Barten |
| 7,211,764 B2 | 5/2007 | Leisner et al. |
| 7,235,759 B2 | 6/2007 | Geissler |
| 7,262,387 B2 | 8/2007 | Uecker |
| 7,265,318 B2 | 9/2007 | Fosbinder |
| 7,265,319 B2 | 9/2007 | Fosbinder et al. |
| 7,291,808 B2 | 11/2007 | Burgstaller et al. |
| 7,319,206 B2 | 1/2008 | Thommes |
| 7,323,658 B2 | 1/2008 | Rice et al. |
| 7,428,843 B2 | 9/2008 | Prock |
| 7,429,712 B2 | 9/2008 | Stanzel et al. |
| 7,686,853 B2 | 3/2010 | Seman, Jr. et al. |
| 7,700,893 B2 | 4/2010 | Kaufman |
| 7,730,921 B2 | 6/2010 | Acors |
| 7,777,447 B2 | 8/2010 | Vogel |
| 7,778,056 B2 | 8/2010 | Geissler |
| 7,781,699 B2 | 8/2010 | Schneider |
| 7,781,700 B2 | 8/2010 | Harris |
| 7,817,091 B2 | 10/2010 | Gezici et al. |
| 7,858,895 B2 | 12/2010 | Moore |
| 8,035,059 B2 | 10/2011 | Artelsmair |
| 8,080,762 B2 | 12/2011 | Martin et al. |
| 8,264,188 B2 | 9/2012 | Veik |
| 8,291,602 B2 | 10/2012 | Korb et al. |
| 8,299,398 B2 | 10/2012 | Madsen |
| 8,536,488 B2 | 9/2013 | Ertmer et al. |
| 8,558,139 B2 | 10/2013 | Albrecht |
| 8,592,722 B2 | 11/2013 | Ulrich et al. |
| 8,618,441 B2 | 12/2013 | McQuerry |
| 8,664,564 B2 | 3/2014 | Vogel et al. |
| 8,698,035 B2 | 4/2014 | Fisk |
| 8,735,775 B2 | 5/2014 | Kaufman |
| 8,742,280 B2 | 6/2014 | Vogel |
| 8,785,817 B2 | 7/2014 | Luck et al. |
| 8,796,586 B2 | 8/2014 | Fulcer et al. |
| 8,803,032 B2 | 8/2014 | Matthews et al. |
| 8,824,175 B2 | 9/2014 | Sickels et al. |
| 8,890,021 B2 | 11/2014 | Shipulski et al. |
| 8,938,867 B2 | 1/2015 | Filiatrault et al. |
| 8,987,638 B2 | 3/2015 | Hiroi et al. |
| 9,065,305 B2 | 6/2015 | Trinkner |
| 9,073,139 B2 | 7/2015 | Christopher et al. |
| 9,089,923 B2 | 7/2015 | Wilder et al. |
| 9,101,999 B2 | 8/2015 | Lambert et al. |
| 9,156,104 B2 | 10/2015 | Diedrick et al. |
| 9,162,311 B2 | 10/2015 | Ott |
| 9,174,295 B2 | 11/2015 | Swartz |
| 9,180,587 B2 | 11/2015 | Rozmarynowski |
| 9,186,743 B2 | 11/2015 | Radtke et al. |
| 9,308,597 B2 | 4/2016 | Matus et al. |
| 9,308,598 B2 | 4/2016 | Madsen et al. |
| 9,308,605 B2 | 4/2016 | Jokinen et al. |
| 9,315,283 B2 | 4/2016 | Neeser et al. |
| 9,381,593 B2 | 7/2016 | DuVal et al. |
| 9,399,263 B2 | 7/2016 | Bashore et al. |
| 9,407,185 B2 | 8/2016 | Jochman |
| 9,442,481 B2 | 9/2016 | Davidson et al. |
| 9,449,498 B2 | 9/2016 | Dina et al. |
| 9,486,874 B2 | 11/2016 | Giese |
| 9,511,435 B2 | 12/2016 | Bavhammar et al. |
| 9,531,276 B2 | 12/2016 | Knoll et al. |
| 9,533,367 B2 | 1/2017 | Carrier et al. |
| 9,636,766 B2 | 5/2017 | Uecker et al. |
| 9,651,114 B2 | 5/2017 | Filiatrault et al. |
| 9,676,050 B2 | 6/2017 | Albrecht |
| 9,712,947 B2 | 7/2017 | Dina et al. |
| 9,737,949 B2 | 8/2017 | Beeson |
| 9,764,407 B2 | 9/2017 | Dantinne et al. |
| 9,789,559 B2 | 10/2017 | Geissler et al. |
| 9,821,413 B2 | 11/2017 | Feldhausen et al. |
| 9,839,968 B2 | 12/2017 | Borchert et al. |
| 9,839,969 B2 | 12/2017 | Granato, Jr. et al. |
| 9,862,053 B2 | 1/2018 | Ulrich |
| 9,919,376 B2 | 3/2018 | Starzengruber et al. |
| 9,925,614 B2 | 3/2018 | Albrecht |
| 9,943,924 B2 | 4/2018 | Denis et al. |
| 9,977,242 B2 | 5/2018 | Patel et al. |
| 9,993,890 B2 | 6/2018 | Denis et al. |
| 10,010,961 B2 | 7/2018 | Peters et al. |
| 10,040,141 B2 | 8/2018 | Rajagopalan et al. |
| 10,076,809 B2 | 9/2018 | Rappl et al. |
| 10,099,308 B2 | 10/2018 | Vogel et al. |

(56) References Cited

U.S. PATENT DOCUMENTS

| | | | |
|---|---|---|---|
| 10,105,782 B2 | 10/2018 | Becker et al. |
| 10,118,241 B2 | 11/2018 | Mehn et al. |
| 10,144,083 B2 | 12/2018 | Radtke et al. |
| 10,144,084 B2 | 12/2018 | Bunker et al. |
| 10,144,085 B2 | 12/2018 | Reynolds et al. |
| 10,166,624 B2 | 1/2019 | Furman et al. |
| 10,183,352 B2 | 1/2019 | Stanzel et al. |
| 10,201,870 B2 | 2/2019 | Plottier et al. |
| 10,227,149 B2 | 3/2019 | Keller |
| 10,270,719 B2 | 4/2019 | Nelson et al. |
| 10,279,415 B2 | 5/2019 | Hsu et al. |
| 10,363,627 B2 | 7/2019 | Denis et al. |
| 10,391,577 B2 | 8/2019 | Ulrich et al. |
| 10,421,143 B2 | 9/2019 | Albrecht |
| 10,449,615 B2 | 10/2019 | Schartner |
| 2001/0002583 A1 | 10/2001 | Kraus et al. |
| 2005/0230372 A1 | 10/2005 | Ott |
| 2006/0001915 A1 | 1/2006 | Seman et al. |
| 2006/0010269 A1 | 5/2006 | Ihde et al. |
| 2008/0001762 A1 | 1/2008 | Uecker |
| 2008/0015678 A1 | 7/2008 | Rice et al. |
| 2008/0019090 A1 | 8/2008 | Aigner |
| 2008/0020307 A1 | 8/2008 | Feldhausen et al. |
| 2008/0021067 A1 | 9/2008 | Lambirth et al. |
| 2008/0223830 A1 | 9/2008 | Gibbons et al. |
| 2008/0030854 A1 | 12/2008 | Hiroi et al. |
| 2008/0031488 A1 | 12/2008 | Hutchison |
| 2009/0015225 A1 | 6/2009 | Dantinne et al. |
| 2009/0026680 A1 | 10/2009 | Thommes |
| 2009/0027789 A1 | 11/2009 | Speilman |
| 2010/0001263 A1 | 1/2010 | Wierschke et al. |
| 2010/0005948 A1 | 3/2010 | Hutchison et al. |
| 2010/0193487 A1 | 8/2010 | Geissler |
| 2011/0008914 A1 | 4/2011 | Acors |
| 2011/0018655 A1 | 8/2011 | Heinrich et al. |
| 2011/0019831 A1 | 8/2011 | Casner |
| 2011/0022061 A1 | 9/2011 | Mehn et al. |
| 2012/0000679 A1 | 1/2012 | Rozmarynowski et al. |
| 2012/0175356 A1 | 7/2012 | Magerl et al. |
| 2012/0024142 A1 | 9/2012 | Kowaleski |
| 2012/0241429 A1 | 9/2012 | Knoener et al. |
| 2012/0032579 A1 | 12/2012 | Stein et al. |
| 2012/0318778 A1 | 12/2012 | Joubert |
| 2014/0000116 A1 | 1/2014 | Bunker et al. |
| 2014/0001167 A1 | 1/2014 | Albrecht |
| 2014/0014489 A1 | 5/2014 | Ulrich et al. |
| 2014/0025197 A1 | 9/2014 | Vogel |
| 2014/0026324 A1 | 9/2014 | Ulrich et al. |
| 2014/0033251 A1 | 11/2014 | Luck et al. |
| 2015/0004144 A1 | 2/2015 | Niedereder et al. |
| 2015/0006903 A1 | 3/2015 | Farah |
| 2015/0007612 A1 | 3/2015 | Krupp et al. |
| 2015/0018304 A1 | 7/2015 | Starzengruber et al. |
| 2015/0026612 A1 | 9/2015 | Enyedy et al. |
| 2015/0273611 A1* | 10/2015 | Denis ................... H04W 12/50 219/132 |
| 2015/0032871 A1 | 11/2015 | Miyahara |
| 2016/0004639 A1 | 2/2016 | Neeser et al. |
| 2016/0006781 A1 | 3/2016 | Radtke et al. |
| 2016/0010148 A1 | 4/2016 | Ott |
| 2016/0012951 A1 | 5/2016 | Schartner et al. |
| 2016/0021420 A1 | 7/2016 | Beeson et al. |
| 2016/0221104 A1 | 8/2016 | Madsen et al. |
| 2016/0034686 A1 | 12/2016 | Davidson et al. |
| 2017/0002850 A1 | 2/2017 | Radtke et al. |
| 2017/0003628 A1 | 2/2017 | Albrecht et al. |
| 2017/0050256 A1 | 2/2017 | Enyedy |
| 2017/0050257 A1 | 2/2017 | Leiteritz et al. |
| 2017/0189986 A1 | 7/2017 | Henry |
| 2017/0023261 A1 | 8/2017 | Hammock |
| 2017/0026674 A1 | 9/2017 | Stockton |
| 2017/0028227 A1 | 10/2017 | Knoener et al. |
| 2017/0036863 A1 | 12/2017 | Schartner et al. |
| 2018/0002187 A1 | 1/2018 | Ellis |
| 2018/0005642 A1 | 3/2018 | Batzler |
| 2018/0056902 A1 | 3/2018 | Ihde et al. |
| 2018/0009334 A1 | 4/2018 | Granato, Jr. et al. |
| 2018/0011771 A1 | 5/2018 | Rajagopalan et al. |
| 2018/0013037 A1 | 5/2018 | Meess et al. |
| 2018/0123370 A1 | 5/2018 | Schartner |
| 2018/0017195 A1 | 6/2018 | Orvedahl |
| 2018/0020774 A1 | 7/2018 | Enyedy et al. |
| 2018/0185948 A1 | 7/2018 | Knoener et al. |
| 2018/0021497 A1 | 8/2018 | Ihde |
| 2018/0022932 A1 | 8/2018 | Denis et al. |
| 2018/0026457 A1 | 9/2018 | Denis et al. |
| 2018/0264581 A1* | 9/2018 | Schraff ................ B23K 9/0953 |
| 2018/0036996 A1 | 12/2018 | Rappl et al. |
| 2018/0369886 A1 | 12/2018 | McQuerry et al. |
| 2019/0006980 A1 | 1/2019 | Sheeks |
| 2019/0007695 A1 | 3/2019 | Becker et al. |
| 2019/0070688 A1 | 3/2019 | Mehn et al. |
| 2019/0010572 A1 | 4/2019 | Reynolds et al. |
| 2019/0099826 A1 | 4/2019 | Vogel et al. |
| 2019/0121131 A1 | 4/2019 | Patel et al. |
| 2019/0015197 A1 | 5/2019 | Radtke et al. |
| 2019/0016833 A1 | 6/2019 | Renner |
| 2019/0016890 A1 | 6/2019 | Keller |
| 2019/0199662 A1 | 6/2019 | Nelson et al. |
| 2019/0024076 A1 | 8/2019 | Ihde |
| 2019/0232413 A1 | 8/2019 | Ulrich |
| 2019/0031492 A1 | 10/2019 | Bunker et al. |
| 2019/0032934 A1 | 10/2019 | Radtke |
| 2019/0299341 A1 | 10/2019 | Dessart et al. |
| 2019/0337081 A1 | 11/2019 | Anders et al. |
| 2019/0358727 A1 | 11/2019 | Albrecht |
| 2019/0363643 A1 | 11/2019 | Borowski et al. |
| 2021/0027657 A1* | 1/2021 | Becker ................... B23K 9/282 |
| 2021/0346973 A1* | 11/2021 | Sandahl ............... B23K 9/1087 |

FOREIGN PATENT DOCUMENTS

| | | |
|---|---|---|
| CN | 2584339 Y | 11/2003 |
| CN | 201201102 Y | 3/2009 |
| CN | 201371328 Y | 12/2009 |
| CN | 201699463 U | 1/2011 |
| CN | 202212709 U | 5/2012 |
| CN | 202491026 U | 10/2012 |
| CN | 202825049 U | 3/2013 |
| CN | 103624411 A | 3/2014 |
| CN | 203918156 U | 11/2014 |
| CN | 103128419 B | 2/2015 |
| CN | 204262646 U | 4/2015 |
| CN | 103128425 B | 9/2015 |
| CN | 103692059 B | 9/2015 |
| CN | 204603640 U | 9/2015 |
| CN | 205324945 U | 6/2016 |
| CN | 304045661 S | 2/2017 |
| CN | 206230125 U | 6/2017 |
| CN | 106141378 B | 9/2017 |
| CN | 207255449 U | 4/2018 |
| CN | 207344021 U | 5/2018 |
| CN | 108406184 A | 8/2018 |
| CN | 108555433 A | 9/2018 |
| CN | 208178836 U | 12/2018 |
| CN | 106425029 B | 5/2019 |
| CN | 110052743 A | 7/2019 |
| DE | 2939045 A1 | 7/1980 |
| DE | 3236605 C1 | 12/1983 |
| DE | 8535215 U1 | 4/1987 |
| DE | 4305339 C2 | 11/1995 |
| DE | 202006007244 U1 | 7/2006 |
| DE | 202006015816 U1 | 12/2006 |
| DE | 102009040957 B4 | 9/2011 |
| DE | 102013205513 A1 | 10/2013 |
| EP | 0001815 A1 | 5/1979 |
| EP | 0667205 A1 | 8/1995 |
| EP | 0901865 B1 | 7/2006 |
| EP | 1882541 B1 | 12/2009 |
| EP | 2846431 A1 | 3/2015 |
| EP | 2882559 B1* | 4/2016 ......... B23K 37/0294 |
| EP | 2942142 B1 | 7/2019 |

(56) References Cited

FOREIGN PATENT DOCUMENTS

| | | |
|---|---|---|
| KR | 102059362 B1 | 12/2019 |
| WO | 00069593 A1 | 11/2000 |
| WO | 2008022654 A1 | 2/2008 |

OTHER PUBLICATIONS

Extended European Search Report for Application No. 21741541.3 dated Jan. 4, 2024 (10 pages).
International Search Report and Written Opinion for Application No. PCT/US2021/013193 dated May 11, 2021 (12 pages).

* cited by examiner

PORTABLE BATTERY PACK-POWERED WELDER

RELATED APPLICATIONS

This application claims the benefit of U.S. Provisional Patent Application No. 62/960,423, filed Jan. 13, 2020, the entire content of which is hereby incorporated by reference.

BACKGROUND

Embodiments described herein provide electric welders.

SUMMARY

Portable welders described herein include a portable housing, a ground clamp, an electrode holder, a user interface, and a battery pack interface. The ground clamp is connected to the portable housing through a ground cable and is configured to be connected to a metal workpiece. The electrode holder is connected to the portable housing through an electrode cable. The electrode holder includes a mount connected to the electrode cable and a user input. The mount is configured to hold a consumable electrode. The user input is configured to activate the portable welder. The user interface located on the housing. The battery pack interface is configured to receive a removable and rechargeable battery pack.

In some aspects, a voltage output of the portable welder is controlled using a voltage converter.

In some aspects, the converter is a buck converter.

In some aspects, the user interface displays a state-of-charge of the battery pack.

In some aspects, the portable welders include a wireless communication controller configured to wirelessly communicate with an external device, and a setting of the portable welder is controlled based on a signal from an external device.

In some aspects, the setting of the portable welder is an ON or OFF state of a security lockout system.

In some aspects, the portable welder is configured to be powered by between a 200 Watt-hour battery pack and a 1000 Watt-hour battery pack.

In some aspects, the portable welder is configured to be powered by an AC/DC adapter.

In some aspects, the portable welders include a fan.

In some aspects, the portable welder controls the operation of the fan based on a temperature associated with the portable welder.

In some aspects, the fan of the portable welder is controlled to turn ON based on a first temperature threshold and to turn OFF based on a second temperature threshold.

In some aspects, the first temperature threshold is different from the second temperature threshold.

In some aspects, the portable welder determines a remaining runtime of the portable welder based on a state-of-charge of the battery pack.

In some aspects, an indication of the remaining runtime is configured to be displayed in the user interface.

Portable welders described herein include a portable housing, an electrode holder, a user interface, and a battery pack interface. The electrode holder is connected to the housing through an electrode cable. The electrode holder includes a consumable electrode, a mount connected to the electrode cable, and a user input. The mount is configured to hold the consumable electrode. The user input is configured to activate the portable welder. The user interface is located on the housing. The battery pack interface is configured to receive a removable and rechargeable battery pack.

In some aspects, a voltage output of the portable welder is controlled using a voltage converter.

In some aspects, the converter is a buck converter.

In some aspects, the user interface displays a state-of-charge of the battery pack.

In some aspects, the portable welders include a wireless communication controller configured to wirelessly communicate with an external device, and a setting of the portable welder is controlled based on a signal from an external device.

In some aspects, the setting of the portable welder is an ON or OFF state of a security lockout system.

In some aspects, the portable welder is configured to be powered by between a 200 Watt-hour battery pack and a 1000 Watt-hour battery pack.

In some aspects, the portable welder is configured to be powered by an AC/DC adapter.

In some aspects, the portable welders include a fan.

In some aspects, the portable welder controls the operation of the fan based on a temperature associated with the portable welder.

In some aspects, the fan of the portable welder is controlled to turn ON based on a first temperature threshold and to turn OFF based on a second temperature threshold.

In some aspects, the first temperature threshold is different from the second temperature threshold.

In some aspects, the portable welder determines a remaining runtime of the portable welder based on a state-of-charge of the battery pack.

In some aspects, an indication of the remaining runtime is configured to be displayed in the user interface.

In some aspects, the consumable electrode is a fixed-length consumable electrode.

In some aspects, the portable welders include a wire feed mechanism supported by the portable housing for feeding a consumable welding wire through the electrode cable.

Portable welders described herein include a portable housing, an electrode holder, a user interface, a battery pack interface, and a wireless communication controller. The electrode holder is connected to the housing through an electrode cable. The electrode holder includes a consumable electrode, a mount connected to the electrode cable, and a user input. The mount is configured to hold the consumable electrode. The user input is configured to activate the portable welder. The user interface located on the housing. The battery pack interface is configured to receive a removable and rechargeable battery pack. The wireless communication controller is configured to wirelessly communicate with an external device.

In some aspects, a voltage output of the portable welder is controlled using a voltage converter.

In some aspects, the converter is a buck converter.

In some aspects, the user interface displays a state-of-charge of the battery pack.

In some aspects, a setting of the portable welder is controlled based on a signal from the external device.

In some aspects, the setting of the portable welder is an ON or OFF state of a security lockout system.

In some aspects, the portable welder is configured to be powered by between a 200 Watt-hour battery pack and a 1000 Watt-hour battery pack.

In some aspects, the portable welder is configured to be powered by an AC/DC adapter.

In some aspects, the portable welders include a fan.

In some aspects, the portable welder controls the operation of the fan based on a temperature associated with the portable welder.

In some aspects, the fan of the portable welder is controlled to turn ON based on a first temperature threshold and to turn OFF based on a second temperature threshold.

In some aspects, the first temperature threshold is different from the second temperature threshold.

In some aspects, the portable welder determines a remaining runtime of the portable welder based on a state-of-charge of the battery pack.

In some aspects, an indication of the remaining runtime is configured to be displayed in the user interface.

In some aspects, the consumable electrode is a fixed-length consumable electrode.

In some aspects, the portable welders include a wire feed mechanism supported by the portable housing for feeding a consumable welding wire through the electrode cable.

In some aspects, the portable welders include an attachment for a gas source to direct an inert gas to the electrode holder.

Methods of operating a portable welder that includes a portable housing, an electrode holder connected to the housing through an electrode cable, the electrode holder including a consumable electrode, a mount connected to the electrode cable, the mount configured to hold the consumable electrode, and a user input configured to activate the portable welder, and a battery pack interface configured to receive a removable and rechargeable battery pack include determining an amp-hour capacity of the removable and rechargeable battery pack, determine a state-of-charge of the removable and rechargeable battery pack, determining a welding current setting for the portable welder, calculate a remaining runtime for the portable welder based on the amp-hour capacity, the state-of-charge, and the welding current setting, and displaying the remaining runtime for the portable welder on a user interface.

In some aspects, the methods include comparing the remaining runtime for the portable welder to a welding threshold time value related to an amount of time for completing a welding action.

In some aspects, the methods include providing an indication to a user when the remaining runtime for the portable welder is less than the welding threshold time value.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
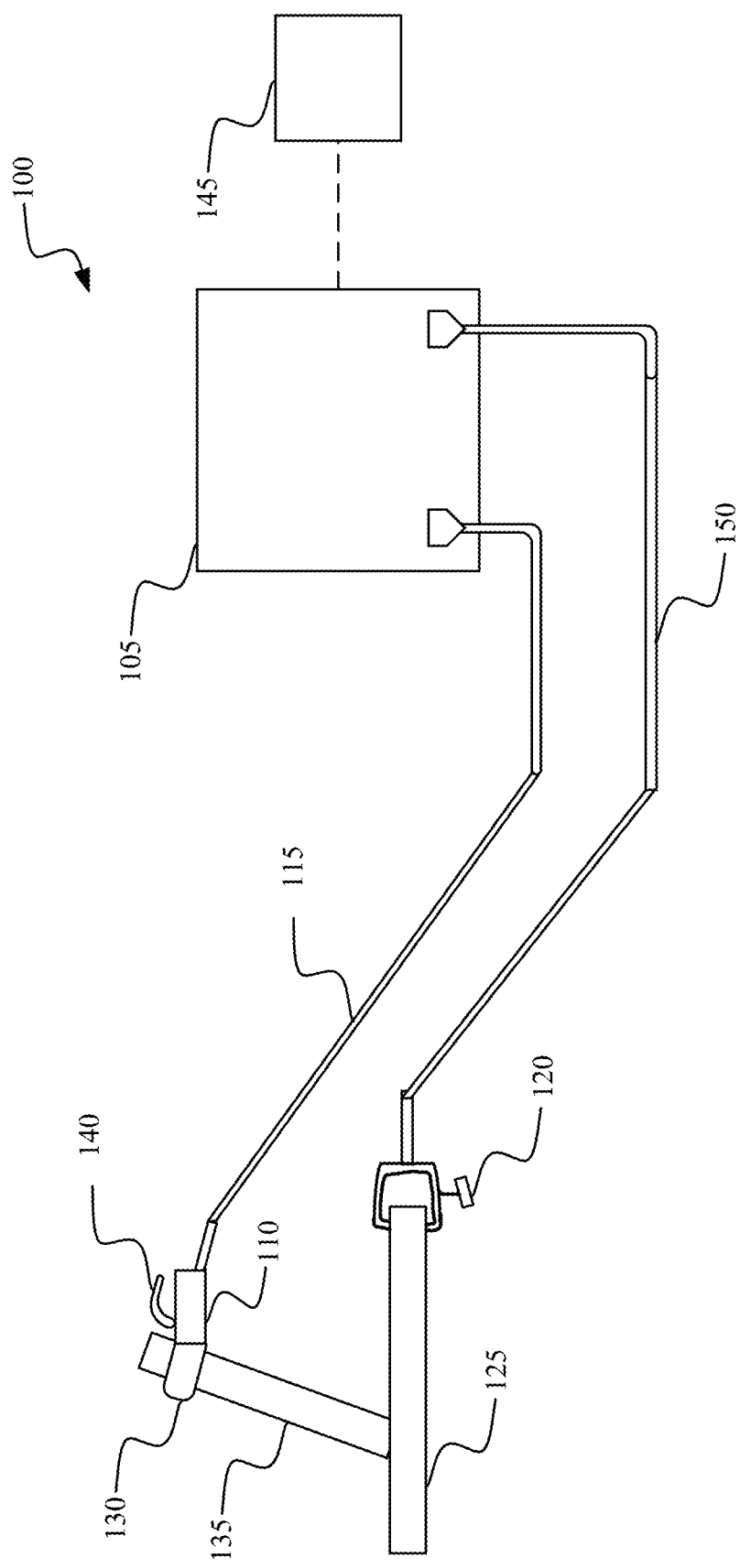
FIG. 1 illustrates a portable welder.

FIG. 1 illustrates a portable welder 100, such as a metal flux-cored arc welder 100. The welder 100 includes a portable housing 105, which may be configured as a backpack and/or include one or more handles to facilitate transport by a user while performing welding operations. The welder 100 also includes an electrode holder 110 connected to the housing 105 by an electrode cable 115, and an electrically conductive ground cable 150 with an associated ground clamp 120 that is connectable to a metal workpiece 125. The electrode holder 110 includes a mount 130 to which a consumable electrode 135 is attached and a user input 140 (e.g., a switch, a button, a trigger, etc.) operable to activate the welder 100 and perform a welding operation on the workpiece.

The welder 100 also includes at least one removable and rechargeable battery pack 145 that is detachably coupled to the housing 105. In the illustrated embodiment, the battery pack 145 is configured as a rechargeable lithium-ion power tool battery pack 145 to provide a source of DC power for directing a current through the electrode cable 115, the electrode holder 110, the electrode 135, the workpiece 125, the ground clamp 120, and/or the ground cable 150 during a welding operation. In particular, the battery pack 145 has a nominal voltage of up to about 80 volts (V) and is operated to output high power (e.g., power of 2760 watts [W] to 3000 W or more [3.7 horsepower (hp) to 4.0 hp or more]) for sustained durations (e.g., at least 5-6 minutes or more). In order to achieve this sustained power, a high sustained current (e.g., 50 amps [A] or more) is discharged from the battery pack 145. Such a battery pack 145 is described in further detail in U.S. patent application Ser. No. 16/025,491, filed Jul. 2, 2018, the entire content of which is incorporated herein by reference.

In other embodiments, rather than using a fixed length consumable electrode 135, the welder 100 may include a wire feed mechanism supported by the housing 105 for feeding a consumable welding wire through the electrode cable 115 to be dispensed from a welding tip of the electrode holder (which in this embodiment would be considered as a welding gun). In such an embodiment, the consumable welding wire may require an inert gas to be applied near the welding tip during a welding process as is common in metal/inert gas (MIG) welding. In this embodiment, the welder 100 may further include a provision for attachment to a gas source for directing an inert gas through the welding tip. The gas source may be a gas tank coupled to the housing via a feed line.

Figure 2B:
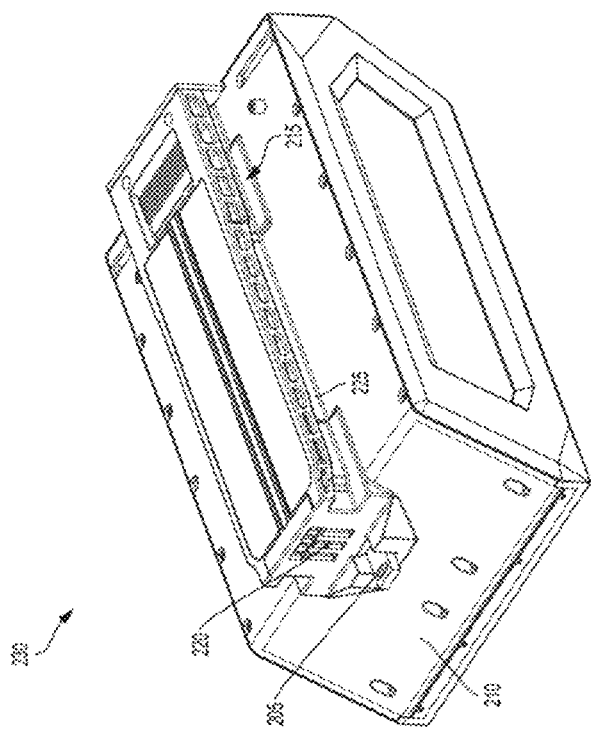
FIGS. 2A and 2B illustrates different sizes of battery packs for powering the portable welder of FIG. 1.
Figure 2A:
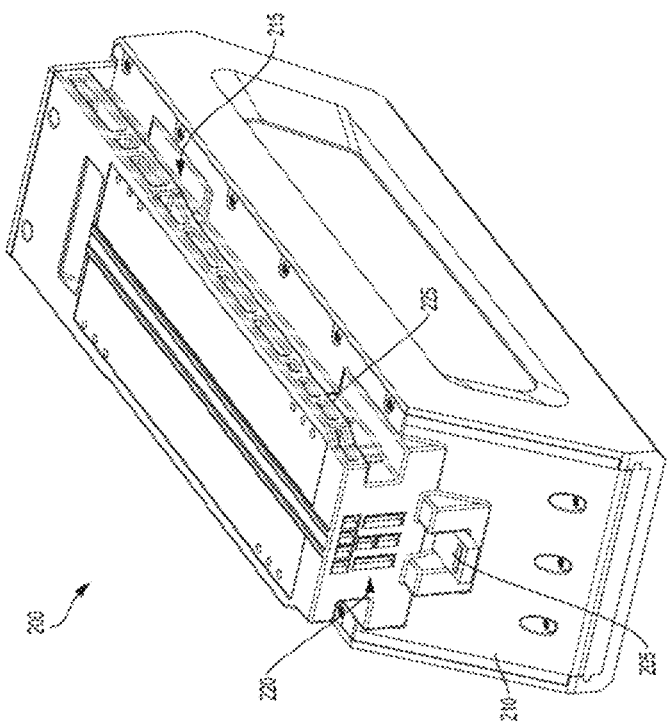

FIG. 2A illustrates a battery pack that is detachable to the portable housing 105. The battery pack may include one or more cell strings, each having a number (e.g., 10) of battery cells connected in series to provide a desired discharge output (e.g., nominal voltage [e.g., 20 V, 40 V, 60 V, 80 V, 120 V] and current capacity). Accordingly, the battery pack 200 may include "20S1P," "20S2P," etc., configuration. In other embodiments, other combinations of battery cells are also possible.

Each battery cell may have a nominal voltage between 3 V and 5 V and may have a nominal capacity between 3 Ampere-hours (Ah) and 5 Ah. Each battery cell has a diameter of up to about 21 mm and a length of up to about 71 mm. The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

With reference to FIG. 2A, the portable welder 100 is capable to run using various battery sizes and power sources, some of which are described below. In some embodiments, the portable welder uses a 216 Watt-hour ("Wh") battery pack. In other embodiments, the portable welder uses a 420 Wh battery pack. In yet another embodiment, the portable welder uses a 630 Wh battery pack or a 1000 Wh battery pack. In some embodiments, the battery pack is between about a 200 Wh battery pack and a 1000 Wh battery pack. In other embodiments, the portable welder 100 is compatible with a wall adapter. The wall adapter fits into a battery location located on the portable welder 100, then may be plugged into the wall to allow the portable welder 100 to be run off of AC power from the AC/DC power adapter.

In some embodiments, the portable welder 100 uses a battery pack having a power rating below 200 Wh. For example, a 27 Wh battery pack (e.g., 18V nominal voltage and a 1.5 Ah capacity) can be used to power the portable welder 100. In some embodiments, a 90 Wh battery pack (e.g., 18V nominal voltage and a 5 Ah capacity) can be used to power the portable welder 100. In some embodiments, a battery pack between 25 Wh and 270 Wh can be used to power the portable welder 100. In some embodiments, a plurality of battery packs are used to power the portable welder 100. For example, two to four battery packs (e.g., 18V nominal voltage and capacities between 1.5 Ah and 15 Ah) can be connected in series or parallel to provide between, for example, 27 Wh and 1080 Wh of power to the portable welder 100.

A battery pack 200 having a 20S1P configuration is illustrated in FIG. 2A in accordance with some embodiments. The battery pack 200 includes a battery pack housing 210 with a support portion 215 and a battery terminal block 220. The battery pack housing 210 encloses components of the battery pack 200 including the battery cells, a battery controller, etc. The support portion 215 provides a slide-on arrangement with a projection/recess 225 cooperating with a complementary projection/recess 225 of the combination.

The battery pack 200 defines a length within a range of approximately 260 mm to approximately 280 mm. In some embodiments, the length 502 is approximately 270 mm. In some embodiments, the length is approximately 270 mm. The battery pack 200 defines a width of the battery pack 200 within a range of approximately 90 mm to approximately 110 mm. In some embodiments, the width is approximately 100 mm. The battery pack 200 defines a height of the battery pack 200 with a range of 96 mm to approximately 116 mm. In some embodiments, the height of the battery pack 200 is approximately 106 mm. The total weight of the battery pack 200 is within a range of approximately 5.5 lbs. to 6.5 lbs. In some embodiments, the total weight of the battery pack 200 is approximately 6 lbs.

The battery pack 200 has an AC internal resistance (ACIR) within a range of approximately 150 mΩ to approximately 160 mΩ. The battery pack 200 has a DC internal resistance within a range of approximately 220 mΩ to approximately 260 mΩ.

FIG. 2B illustrates another embodiment of a battery pack 230 that is detachable to the portable housing 105. The battery pack 230 having a 20S2P configuration is illustrated in accordance with some embodiments. The battery pack 230 includes two cell strings of twenty series connected cells, the cell strings being connected in parallel. The battery pack 230 defines a length within a range of approximately 260 mm to approximately 280 mm. In some embodiments, the length of the battery pack 230 is approximately 270 mm. The battery pack defines a width within a range of approximately 171 mm to approximately 191 mm. In some embodiments, the width of the battery pack 230 is approximately 181 mm. The battery pack 230 defines a height within a range of approximately 96 mm to approximately 116 mm. In some embodiments, the height of the battery pack 230 is approximately 106 mm. The total weight of the battery pack 230 is within a range of approximately 10.25 lbs. to 11.25 lbs. In some embodiments, the total weight of the battery pack 230 is approximately 10.75 lbs. In some embodiments a 20S3P battery pack is detachable to the portable housing 105.

The battery pack 230 has an AC internal resistance (ACIR) within a range of approximately 75 mΩ to approximately 80 mΩ. The battery pack 230 has a DC internal resistance within a range of approximately 130 mΩ to approximately 170 mΩ.

The battery packs 200, 230 of FIG. 2A and FIG. 2B include a switch 205 extending from the housing 210. The switch 205 is configured to be in a first position and a second position. When in the first (e.g., "OFF") position, electrical components (for example, the subcores) of the battery packs 200, 230 contained within the housing 210 are electrically disconnected from each other. When in the second (e.g., "ON") position, electrical components (e.g., battery cell subcores) are electrically connected to each other. The switch 205 may be manipulated by a user from the first position to a second position by pressing or sliding the switch 205.

Figure 3:
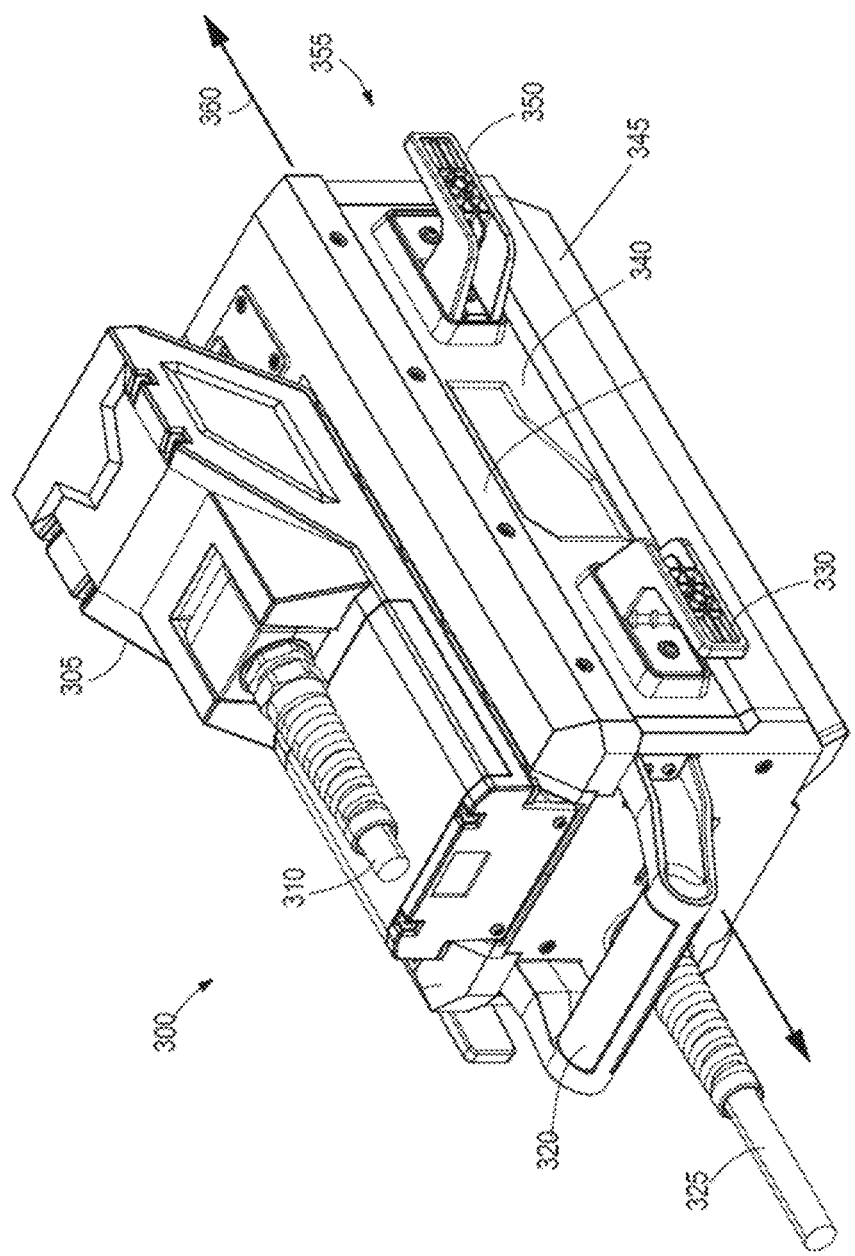
FIG. 3 illustrates an adapter including an AC/DC adapter assembly with a power box.

The portable welder 100 may also be configured to receive a power adapter 305. FIG. 3 illustrates the power adapter 305 is an AC/DC adapter assembly 300 including a power box 340 is operable to receive an input alternating current (AC) power via a power cord and supply direct current (DC) power via an adapter 305 to the portable welder 100. An adapter cord 310 electrically connects the adapter 305 to the power box 340. In other constructions, the power assembly 300 may receive power from another power source (e.g., a DC power source [a battery pack], a generator, etc.).

The power box 340 includes a housing 345 formed, in the illustrated construction, of two clamshell housing halves connected along plane 360. The in illustrated construction, the housing halves are connected with threaded fasteners (e.g., screws) or other suitable coupling means. Together, the housing halves define an internal compartment within the housing 345 containing internal components of the power box 340.

The housing 345 includes a handle 320 formed at a first end opposite a second end and a storage portion operable to selectively receive the power adapter 305 for convenient storage when the power adapter 305 is not in use. In additional or alternative embodiments, the storage portion may be configured to receive the pack engagement portion to selectively couple the battery pack to the power box 340. The storage portion is formed in a first or top side of the power box 340. The storage portion includes a recessed cavity open at an open end proximate the first end and adjacent the handle 320, and closed at a closed end.

The illustrated power box 340 includes a cord wrap arrangement operable to selectively receive a wound cord (e.g., the power cord 325 and/or the adapter cord 310) for compact and convenient storage when the power adapter 305 is not in use. In the illustrated construction, a pair of cord wraps are provided on opposite sides of the housing 345. In the illustrated construction, each cord wrap 355 includes a pair of longitudinally opposed hooks 330, 350 projecting laterally outwardly from the housing 345. That is, in the illustrated construction, a first cord wrap is configured to receive the power cord in a wound configuration. In other constructions, the power box 340 may include a single cord wrap 355 (large enough to receive the provided cords [e.g., the power cord and the adapter cord 310]) or more than two cord wraps 355.

The power adapter cord 310 has a length (e.g., at least about 2 meters [m]) and a diameter (e.g., about 10 mm to about 13 mm). In the illustrated construction, the cord length allows a user to operate the portable adapter 305 at or near an eye level while the power box 340 is resting at or near ground level, which limits excess adapter cord 310 that can be cumbersome during use. In other constructions, the cord length can be less than or greater than 3 meters so as to be adapted to particular uses of the portable adapter 305.

The power box 340 has at least one foot that projects downwardly from the housing 345 and that is engageable with a support surface. In the illustrated construction, the power box 340 has a pair of longitudinally-extending feet at opposite sides of the housing 345. In particular, each of the feet is coupled to a second or bottom side of the housing 345 and has a first surface that is substantially perpendicular to the second side of the power box 340 and a second surface that is oriented at an angle α relative to the second side of the power box 340. Each of the feet has a polygonal cross-section. In other or additional constructions, the power box may have four separate feet positioned proximate the corners. In still other constructions, the power box 340 have feet having any suitable location and configuration. The feet provide the power box 340 with a stable and robust resting surface when the power box 340 is supported on the floor or the ground. For example, the feet allow the power box 340 to straddle obstacles or otherwise address uneven ground surfaces. The feet also raise the housing 345 to a certain height above the ground, thereby preventing or inhibiting contaminants (e.g., pooled liquids, dust, other debris, etc.) from entering the housing 345 and interfering with the internal components of the power box 340. In the illustrated construction, the height is approximately 30 mm, but may range from 20 mm to 40 mm.

The power adapter 300 includes a circuit operable, in the illustrated construction, to receive as input AC and to output DC power. The circuit includes the necessary electrical components to operate as an AC/DC adapter (e.g., a rectifier). The circuit may include other components (e.g., a battery charging circuit portion to charge a connected battery pack, a pass-through circuit portion to output AC power to an AC outlet, an output circuit portion to output DC power to a DC power outlet, etc.). The circuit further includes a Ground Fault Circuit Interrupt (GFCI) protection system to protect against electrical shock during operation. GFCI controls are located on the housing 345 adjacent the storage portion.

Figure 4A:
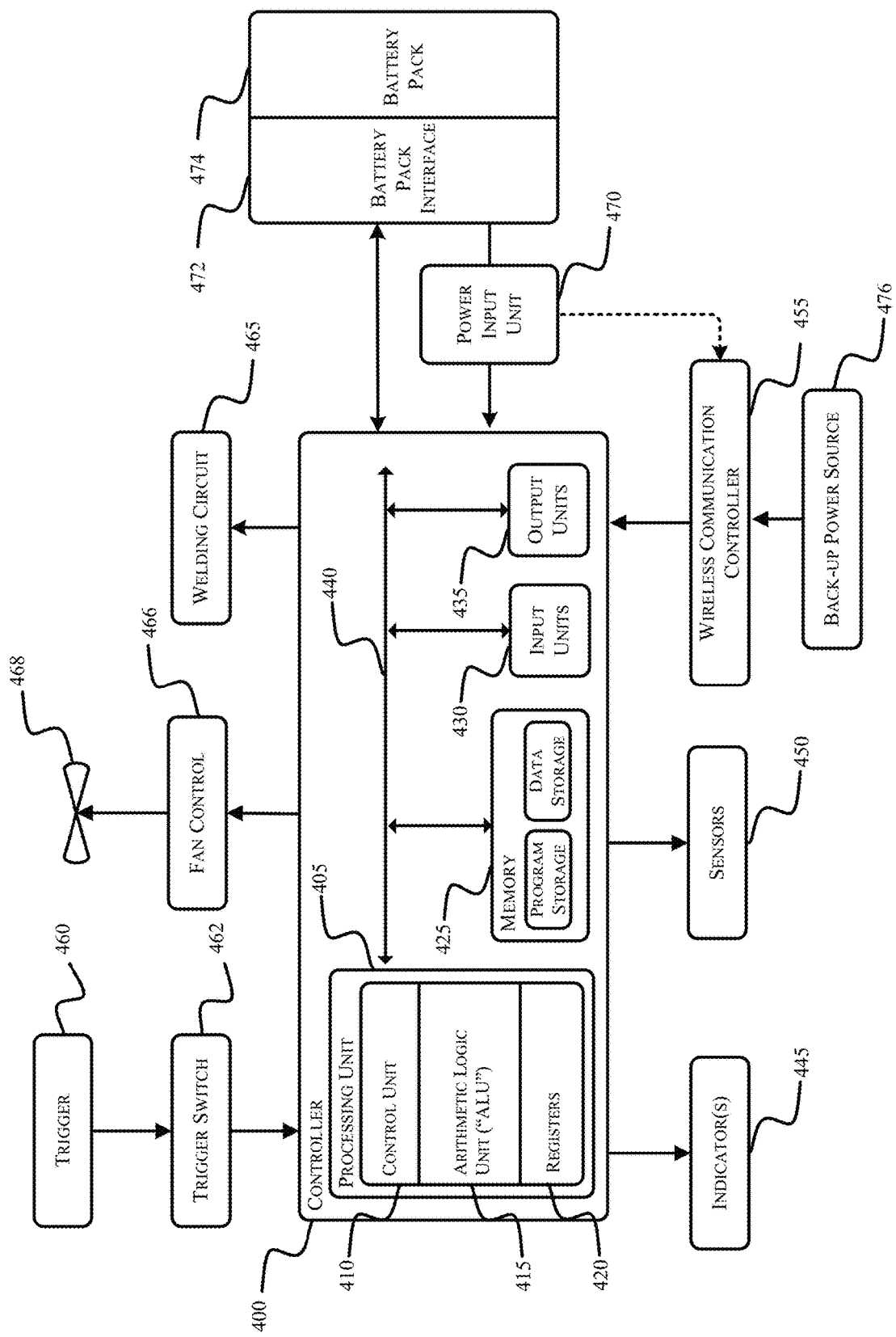
FIG. 4A illustrates a controller for the portable welder of FIG. 1.

FIG. 4A illustrates a controller 400 for the portable welder 100. The controller 400 is electrically and/or communicatively connected to a variety of modules or component of the portable welder 100. For example, the illustrated controller 400 is connected to indicators 445, sensors 450 (which may include, for example, a pressure sensor, a current sensor, a voltage sensor, a position sensor, etc.), a wireless communication controller 455, a trigger 460, a trigger switch 462, a welding circuit 465, a can control circuit 466, a fan 468, and a power input unit 470.

The controller 400 includes a plurality of electrical and electronic components that provide power, operational control, and protection to the components and modules within the controller 400 and/or portable welder 100. For example, the controller 400 includes, among other things, a processing unit 405 (e.g., a microprocessor, an electronic processor, an electronic controller, a microcontroller, or another suitable programmable device), a memory 425, input units 430, and output units 435. The processing unit 405 includes, among other things, a control unit 410, an arithmetic logic unit ("ALU") 415, and a plurality of registers 420 (shown as a group of registers in FIG. 4A), and is implemented using a known computer architecture (e.g., a modified Harvard architecture, a von Neumann architecture, etc.). The processing unit 405, the memory 425, the input units 430, and the output units 435, as well as the various modules or circuits connected to the controller 400 are connected by one or more control and/or data buses (e.g., common bus 440). The control and/or data buses are shown generally in FIG. 4A for illustrative purposes. The use of one or more control and/or data buses for the interconnection between and communication among the various modules and components would be known to a person skilled in the art in view of the embodiments described herein.

The memory 425 is a non-transitory computer readable medium and includes, for example, a program storage area and data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 405 is connected to the memory 425 and executes software instruction that are capable of being stored in a RAM of the memory 425 (e.g., during execution), a ROM of the memory 425 (e.g., on a generally permanent basis), or another non-transitory computer readable medium such as another memory or a disc. Software included in the implementation of the portable welder 100 can be stored in the memory 425 of the controller 400. The software includes, for example, firmware, one or more applications, program data, filters, rules, one or more program modules, and other executable instructions. The controller 400 is configured to retrieve from the memory 425 and execute, among other things, instructions related to the control processes and methods described herein. In other embodiments, the controller 400 includes additional, fewer, or different components.

The controller 400 drive the welding circuit 465 to perform a welding tasks in response to a user's actuation of the trigger 460. Depression of the activation trigger 460 actuates a trigger switch 462, which outputs a signal to the controller 400 to activate the welding circuit. The welding circuit 465 controls the power received from the battery pack 200, 230 to maintain a constant welding power. The welding circuit 465 includes a voltage converter (e.g., a DC-to-DC converter, a synchronous buck converter, an asynchronous buck converter, etc.). The voltage converter and the battery pack 200, 230 provide a constant voltage source for the portable welder 100. When the trigger 460 is released, the trigger switch 462 no longer outputs the actuation signal (or outputs a released signal) to the controller 400. The controller 400 may cease a welding task when the trigger 460 is released by controlling the welding circuit 465 to turn off the welding circuit 465.

A battery pack interface 472 is connected to the controller 400 and couples to a battery pack 474 (e.g., battery pack 200, 230). The battery pack interface 472 includes a combination of mechanical (e.g., a battery pack receiving portion) and electrical components configured to and operable for interfacing (e.g., mechanically, electrically, and communicatively connecting) the portable welder 100 with a battery pack 474. The battery pack interface 472 is coupled to power input unit 470. The battery pack interface 472 transmits the power received from the battery pack to the power input unit 470. The power input unit 470 includes active and/or passive components (e.g., voltage step-down controllers, voltage converters, rectifiers, filters, etc.) to regulate or control the power received through the battery pack interface 472, to the wireless communication controller 455, and controller 400. When the battery pack 474 is not coupled to the portable welder 100, the wireless communication controller 455 is configured to receive power from a back-up power source 476.

The indicators 445 are also coupled to the controller 400 and receive control signals from the controller 400 to turn on and off or otherwise convey information based on different states of the portable welder 100. The indicators 445 include, for example, one or more light-emitting diodes (LEDs), or a display screen. The indicators 445 can be configured to display conditions of, or information associated with, the portable welder 100. For example, the indicators 445 can display information relating to a welding action performed by the portable welder 100. In addition to or in place of visual indicators, the indicators 445 may also include a speaker or a tactile feedback mechanism to convey information to a user through audible or tactile outputs.

Figure 4B:
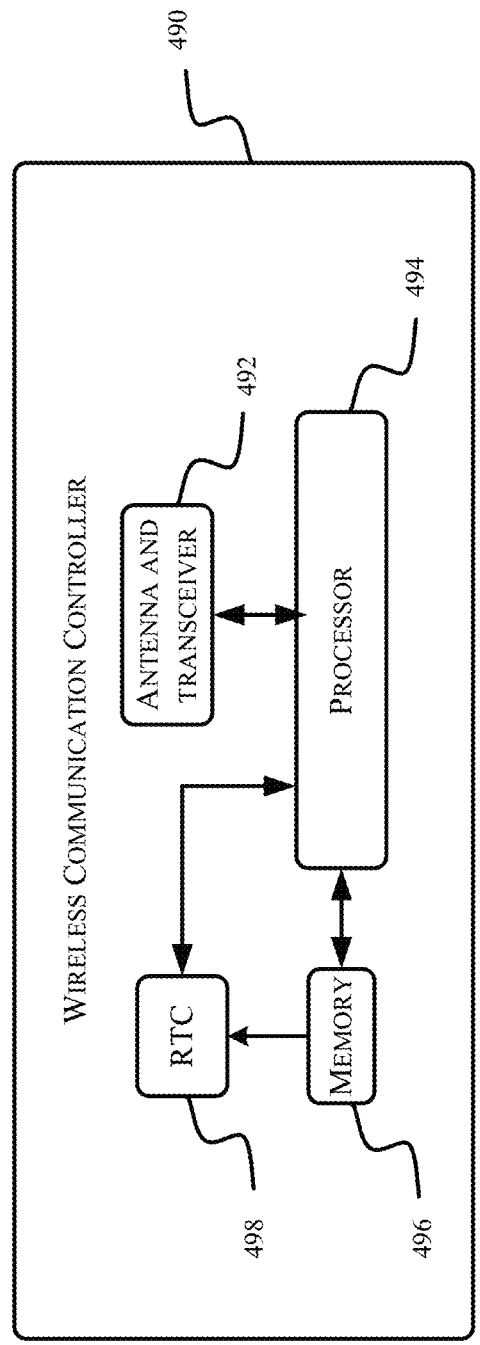
FIG. 4B illustrates a communication controller for the portable welder of FIG. 1.

FIG. 4B illustrates a wireless communication controller 455 for the portable welder 100. The wireless communication controller 455 includes a processor 494, a memory 496, an antenna and transceiver 492, and a real-time clock (RTC) 498. The wireless communication controller 455 enables the portable welder 100 to communicate with an external device 482 (see, e.g., FIG. 4C). The radio antenna and transceiver 492 operate together to send and receive wireless messages to and from the external device 482 and the processor 494. The memory 496 can store instructions to be implemented by the processor 494 and/or may store data related to communications between the portable welder 100 and the external device 482, or the like. The processor 494 for the wireless communication controller 455 controls wireless communications between the portable welder 100 and the external device 482. For example, the processor 494 associated with the wireless communication controller 455 buffers incoming and/or outgoing data communicates with the controller 400, and determines the communication protocol and/or settings to use in wireless communications. The communication via the wireless communication controller 455 can be encrypted to protect the data exchanged between the portable welder 100 and the external device 482 from third parties.

In the illustrated embodiment, the wireless communication controller 455 is a Bluetooth® controller. The Bluetooth® controller communicates with the external device 482 employing the Bluetooth® protocol. Therefore, in the illustrated embodiment, the external device 482 and the portable welder 100 are within a communication range (i.e., in proximity) of each other while they exchange data. In other embodiments, the wireless communication controller 455 communicates using other protocols (e.g., Wi-Fi, Zig-Bee, a proprietary protocol, etc.) over different types of wireless networks. For example, the wireless communication controller 455 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, 4GSM network, a 4G LTE network, 5G New Radio, a Digital AMPS ("IS-136/TDMA") network, or an Integrated Digital Enhanced Network ("iDEN") network, etc.

The wireless communication controller 455 is configured to receive data from the controller 400 and relay the information to the external device 482 via the antenna and transceiver 492. In a similar manner, the wireless communication controller 455 is configured to receive information (e.g., configuration and programming information) from the external device 482 via the antenna and transceiver 492 and relay the information to the controller 400.

The RTC 498 increments and keeps time independently of the other power tool components. The RTC 498 receives power from the battery pack when the battery pack is connected to the portable welder 100, and receives power from the back-up power source 485 when the battery pack is not connected to the portable welder 100. Having the RTC 498 as an independently powered clock enables time stamping of operational data (stored in memory 496 for later export) and a security feature whereby a lockout time is set by a user (e.g., via the external device 482) and the tool is locked-out when the time of the RTC 498 exceeds the set lockout time.

Figure 4C:
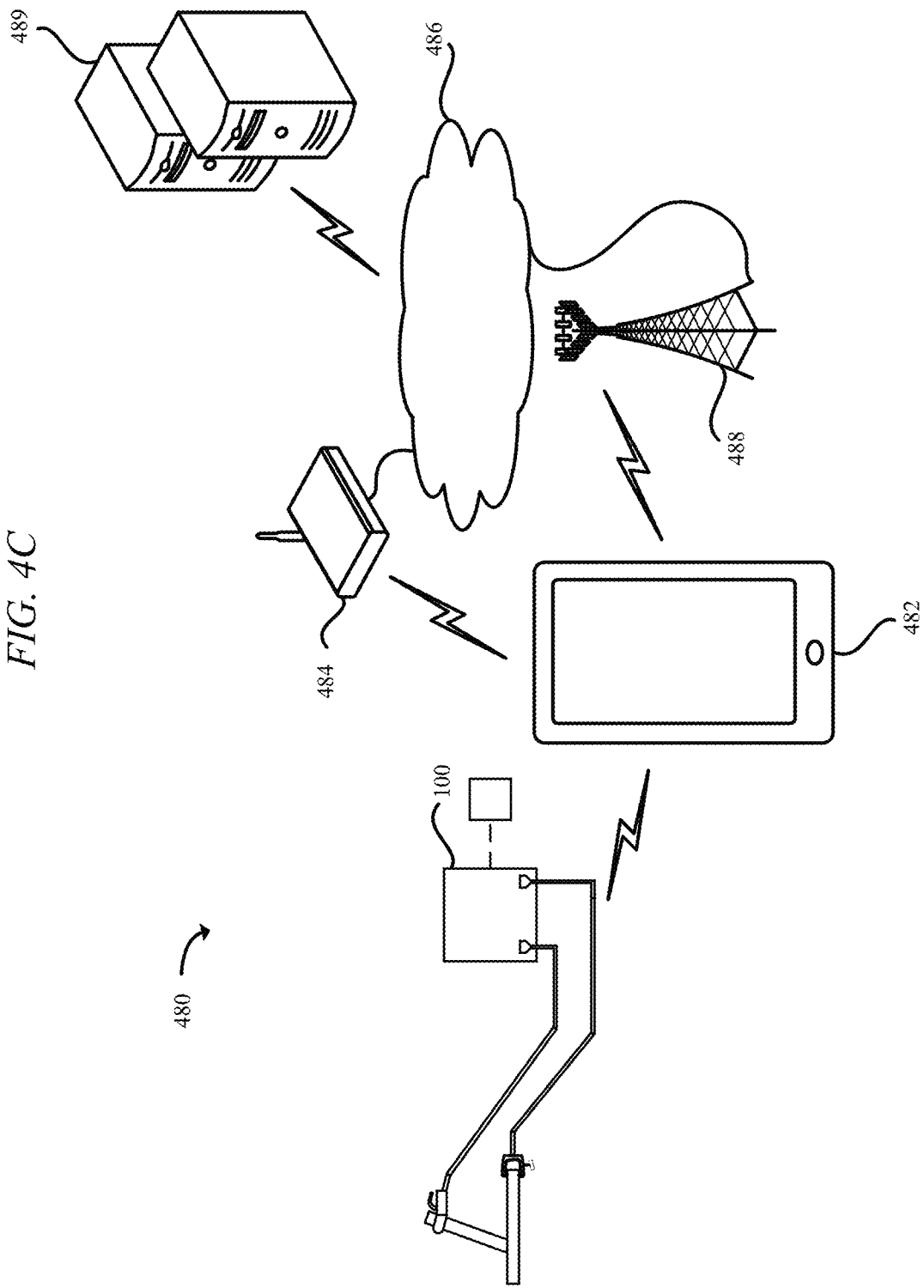
FIG. 4C illustrates a communication system for the portable welder of FIG. 1.

FIG. 4C illustrates a communication system 480. The communication system 480 includes at least one portable welder 100 and the external device 482. Each portable welder 100 and the external device 482 can communicate wirelessly while they are within a communication range of each other. Each portable welder 100 may communicate portable welder 100 status, portable welder 100 operation statistics, portable welder 100 identification, portable welder 100 sensor data, stored portable welder 100 usage information, portable welder 100 maintenance data, and the like.

More specifically, the portable welder 100 can monitor, log, and/or communicate various tool parameters that can be used for confirmation of correct tool performance, detection of a malfunctioning tool, and determination of a need or desire for service. Taking, for example, the portable welder parameters are detected, determined, and/or captured by the controller 400 and output to the external device 482 can include a welding time (e.g., time it takes for the portable welder to perform a welding task), a time (e.g., a number of seconds) that the portable welder 100 is on, a number of overloads, a total number of cycles performed by the tool, a number of cycles performed by the tool since a reset and/or since a last data export, a number of remaining service cycles (i.e., a number of cycles before the tool should be services, recalibrated, repaired, or replaced), a number of transmissions sent to the external device 482, a number of transmission sent to the external device 482, a number of errors generated in the transmissions sent to the external device 605, a code violation resulting in a master control unit (MCU) reset, a short in the power circuitry (e.g., a metal-oxide-semiconductor field-effect transistor [MOSFET] short), a non-maskable interrupt (NMI) hardware MCU Reset (e.g., of the controller 400), an over-discharge condition of the battery pack, an overcurrent condition of the battery pack, a battery dead condition at trigger pull, a tool FETing condition, thermal and stall overload condition at trigger pulled at tool sleep condition, heat sink temperature histogram data, MOSFET junction temperature histogram data (from the current sensor), etc.

Using the external device 482, a user can access the tool parameters for the portable welder 100. With the tool parameters (i.e., tool operational data), a user can determine how the tool has been used (e.g., number of tasks performed), whether maintenance is recommended or has been performed in the past, and identify malfunctioning components or other reasons for certain performance issues. The external device 482 can also transmit data to the portable welder 100 for tool configuration, firmware updates, or to send commands. The external device 482 also allows a user to set operational parameters, safety parameters, select tool modes, and the like for the portable welder 100.

The external device 482 is, for example, a smart phone (as illustrated), a laptop computer, a tablet computer, a personal digital assistant (PDA), or another electronic device capable of communication wirelessly with the portable welder 100 and providing a user interface. The external device 482 provides the user interface and allows a user to access and interact with the portable welder. The external device 482 can receive user inputs to determine operational parameters, enable or disable features, and the like. The user interface of the external device 482 provides an easy-to-use interface for the user to control and customize operation of the portable welder. The external device 482, therefore, grants the user access to the tool operational data of the portable welder, and provides a user interface such that the user can interact with the controller 400 of the portable welder 100.

In addition, as shown in FIG. 4C, the external device 482 can also share tool operational data obtained from the portable welder 100 with a remote server 489 connected through a network 486. The remote server 489 may be used to store the tool operational data obtained from the external device 482, provide additional functionality and service to the user, or a combination thereof. In some embodiments, storing the information on the remote server 489 allows a user to access the information from a plurality of different locations. In some embodiments, the remote server 489 collects information from various users regarding their power tool devices and provide statistics or statistical measures to the user based on information obtained from the different tools. For example, the remote server 489 may provide statistics regarding the experienced efficiency of the portable welder 100, typical usage of the portable welder 100, and other relevant characteristics and/or measures of the portable welder 100. The network 486 may include various networking elements (routers 484, hubs, switches, cellular towers 488, wired connections, wireless connections, etc.) for connecting to, for example, the Internet, a cellular data network, a local network, or a combination thereof as previously described. In some embodiments, the portable welder 100 is configured to communicate directly with the server 489 through an additional wireless interface or with the same wireless interface that the portable welder uses to communicate with the external device 482.

Figure 5:
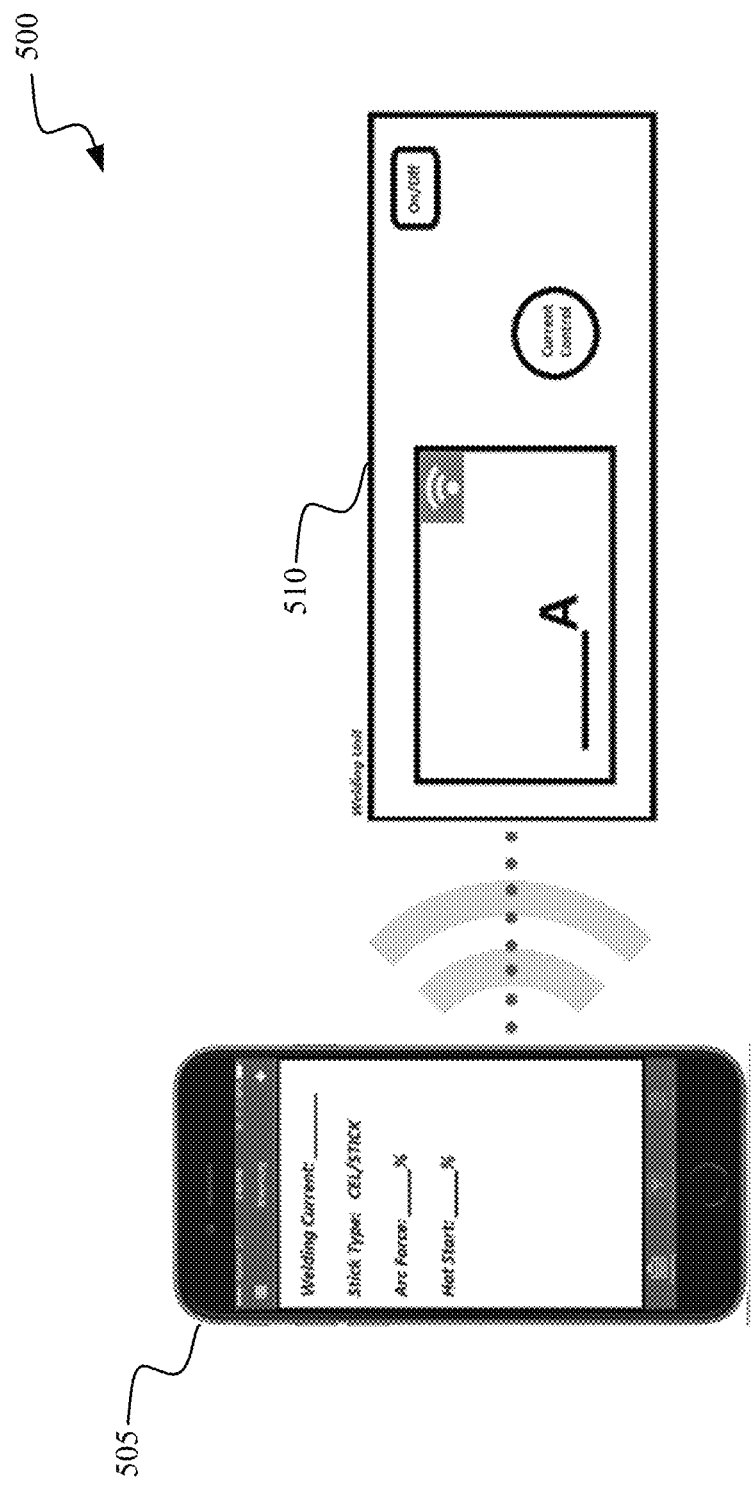
FIG. 5 illustrates a user interface and display for the portable welder communication system of FIG. 4A, FIG. 4B, and FIG. 4C.

FIG. 5 illustrates the user interface 500 from the communication system of FIG. 4A, FIG. 4B, and FIG. 4C. An external device 505 displays different features of the portable welder 100 (e.g., welding current, stick type, arc force, hot start, etc.) and communicates with the portable welder 100's user display 510. This demonstrates communication between external device 505 and the portable welder 100, making it easy for the user of the portable welder to monitor the conditions of the portable welder 100 through the communication system 480.

Figure 6:
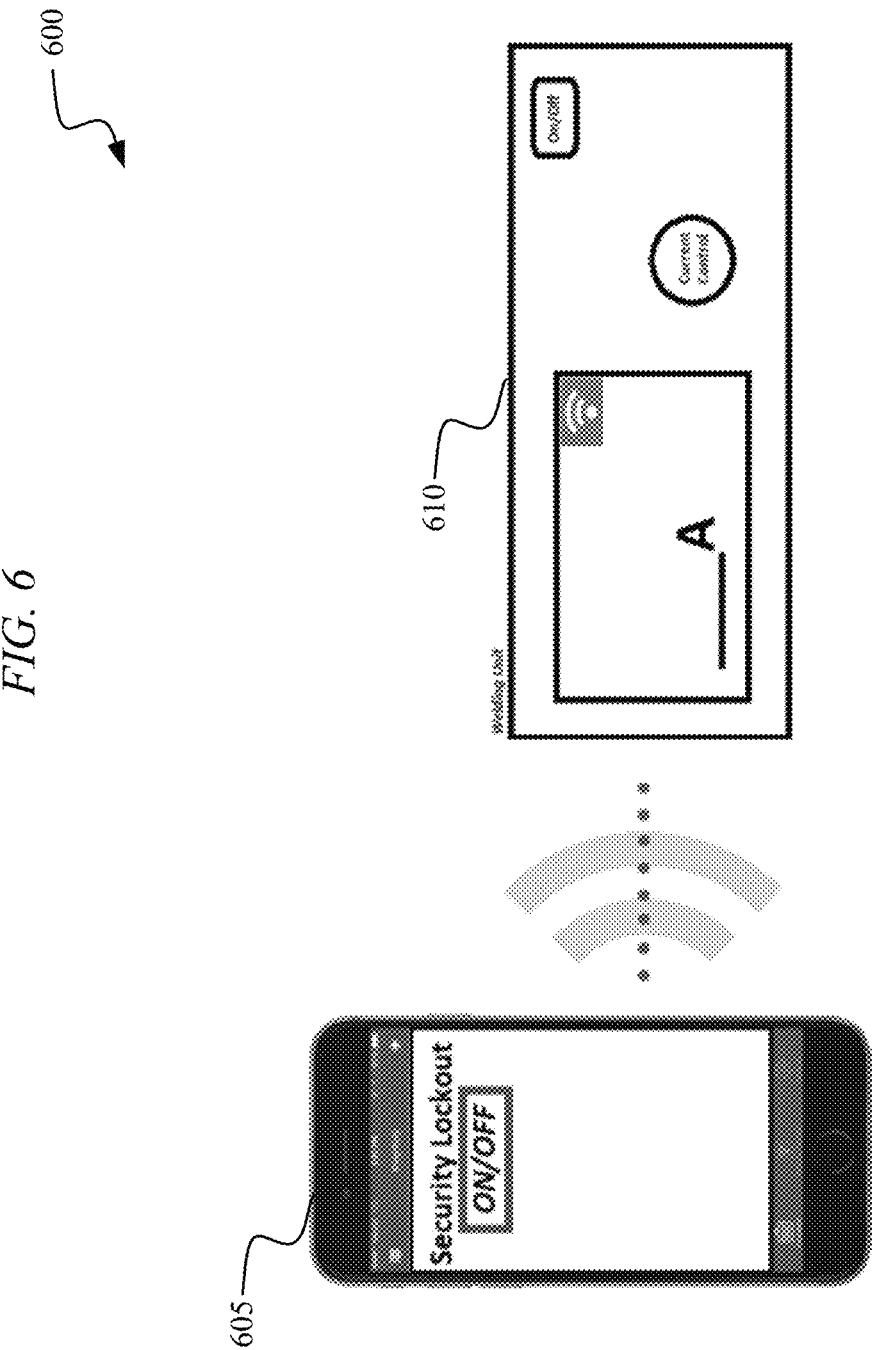
FIG. 6 illustrates a security lockout for the portable welder of FIG. 1.

FIG. 6 illustrates a security lockout system 600 for the portable welder 100. Using an external device 605, an application can be used for locking the portable welder 100 for the purpose of preventing the portable welder 100 from being used by an undesignated user. The external device 605 includes of a user interface. The user interface can be used to turn the security lockout system 600 ON or OFF. A signal is then sent to the portable welder 100, and the result of the action taken on the external device 605 can be displayed on a user interface 610 of the portable welder 100. The user interface 610 of the portable welder then displays an indication of whether the security lockout system 600 is ON or OFF.

The security lockout system 600, when turned on, would prevent a welder electrode output from being live, so as to prevent any arc from being created at all. The security lockout system 600 may prevent the portable welder 100 from turning ON, or, in another embodiment, the user interface 610 of the portable welder 100 may turn ON and indicate a locked tool.

Figure 7:
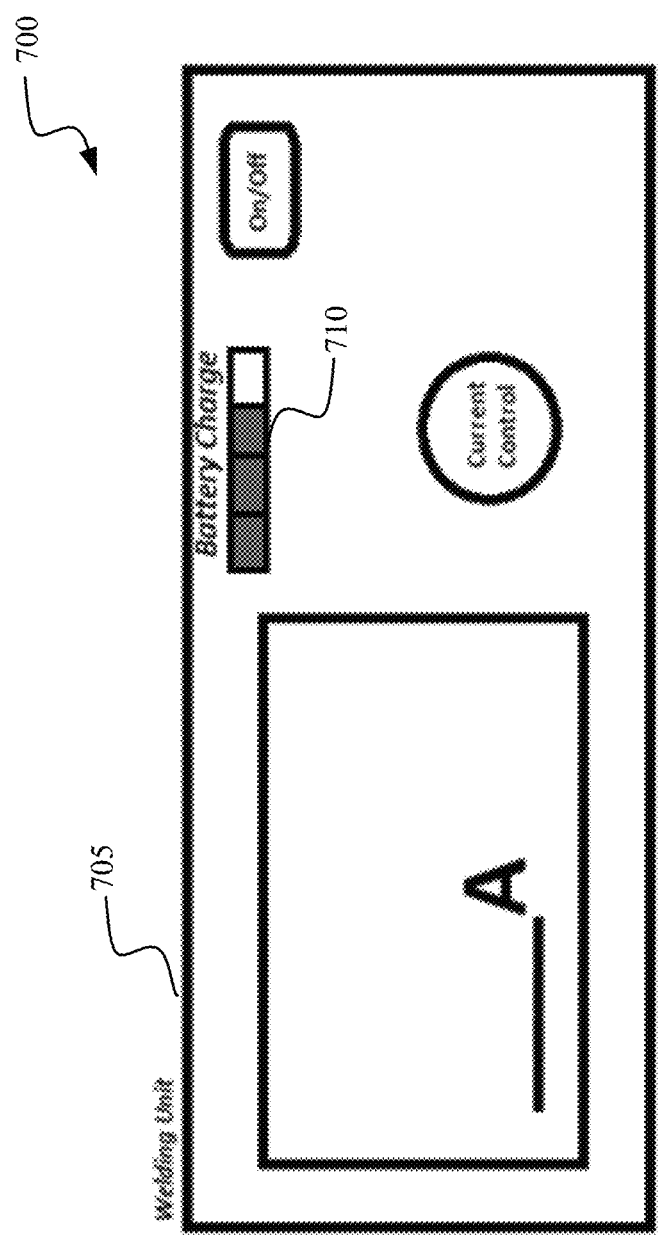
FIG. 7 illustrates a state-of-charge display for the portable welder of FIG. 1.

FIG. 7 illustrates a state-of-charge mirror system 700 on the portable welder 100. A user interface 705 of the portable welder 100 may display a variety of information (e.g., welding current, welding voltage, etc.). An indication 710 of the battery charge provided on the portable welder 100 will allow a user to know the charge of the battery pack 200, 230 easily or from a distance. The indication 710 of the state-of-charge on the user interface 705 will mirror a Fuel Gauge on the battery pack 200, 230, while updating at a refresh rate that allows for accurate battery pack state of charge readings. The battery pack 200, 230 will communicate the state-of-charge and the portable welder 100 will then mirror that value according to a battery charge indication standard on the battery pack 200, 230. This will make the display of the user interface 705 an exact mirror of the battery charge indication on the battery pack 200, 230.

Figure 8A:
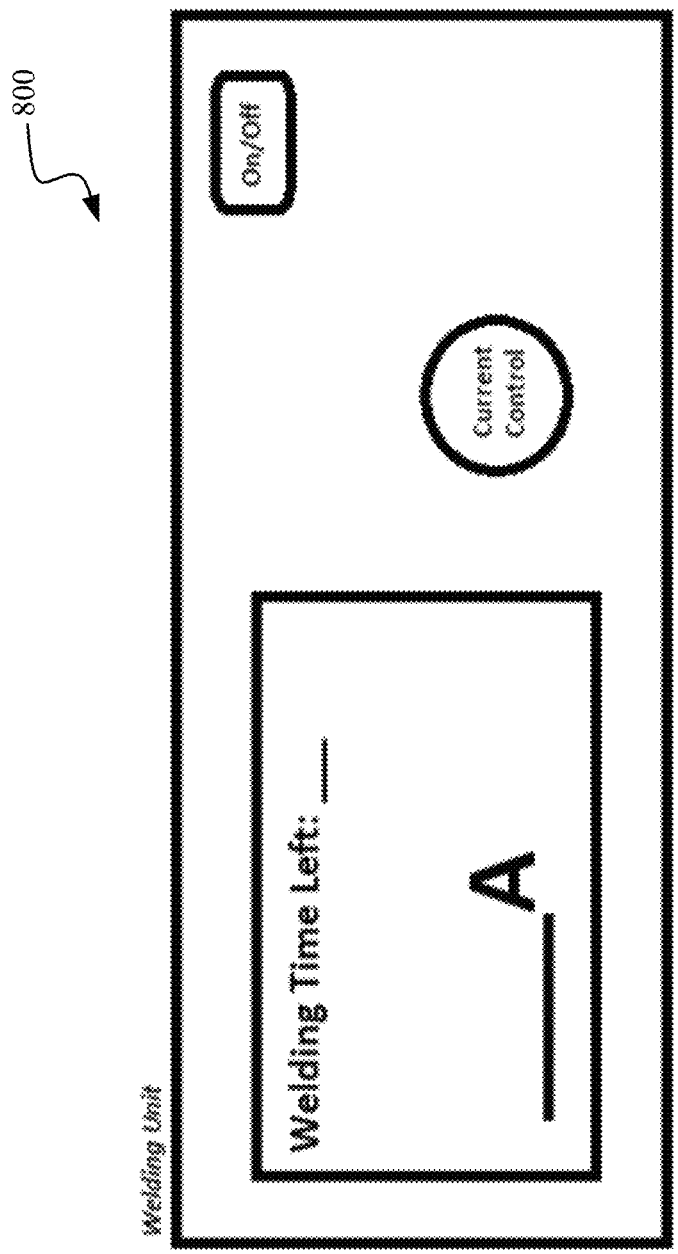
FIG. 8A and FIG. 8B illustrate a runtime remaining calculation method for the portable welder of FIG. 1.

FIG. 8A illustrates an interface 800 of the portable welder 100 for displaying a calculation of how long a user has left to weld using a current battery pack. The calculation is based off the user-set welding current and the size or amp-hour capacity of the battery pack that has been installed on the portable welder 100 itself. The runtime prediction may be presented in the form of time in minutes until the battery pack is depleted.

Figure 8B:
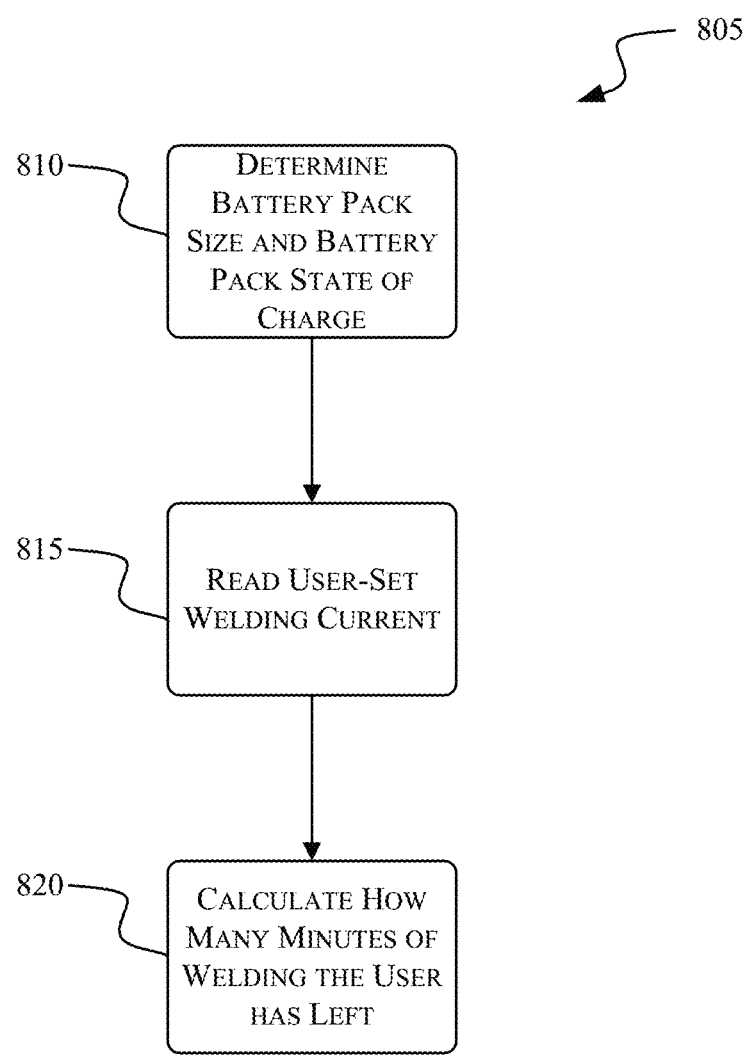

A current runtime prediction alert method 805 is illustrated in FIG. 8B. Initially, the portable welder 100 determines the battery pack size and battery pack state-of-charge (STEP 810). The portable welder 100 reads or determines the user-set welding current (STEP 815). The method 805 uses the battery pack size, the battery pack state-of-charge, and the user-set welding current to calculate how many minutes of welding time the user has remaining (STEP 820). For example, the battery pack communicates a 20% charge, is 216 Wh battery pack, and has a nominal voltage of 72 Volts. The portable welder 100 is set to 140 A at the output, correlating to 85A out of the battery pack. The example runtime prediction calculation is as shown below:

216 Wh×20%=43.2 Wh

72 V×85 A=6120 W $$\frac{43.2 \text{ Wh}}{6120 \text{ W}} = 0.00706 \text{ Hours}$$

0.00706 Hours=25.4 seconds of runtime remaining

Figure 9A:
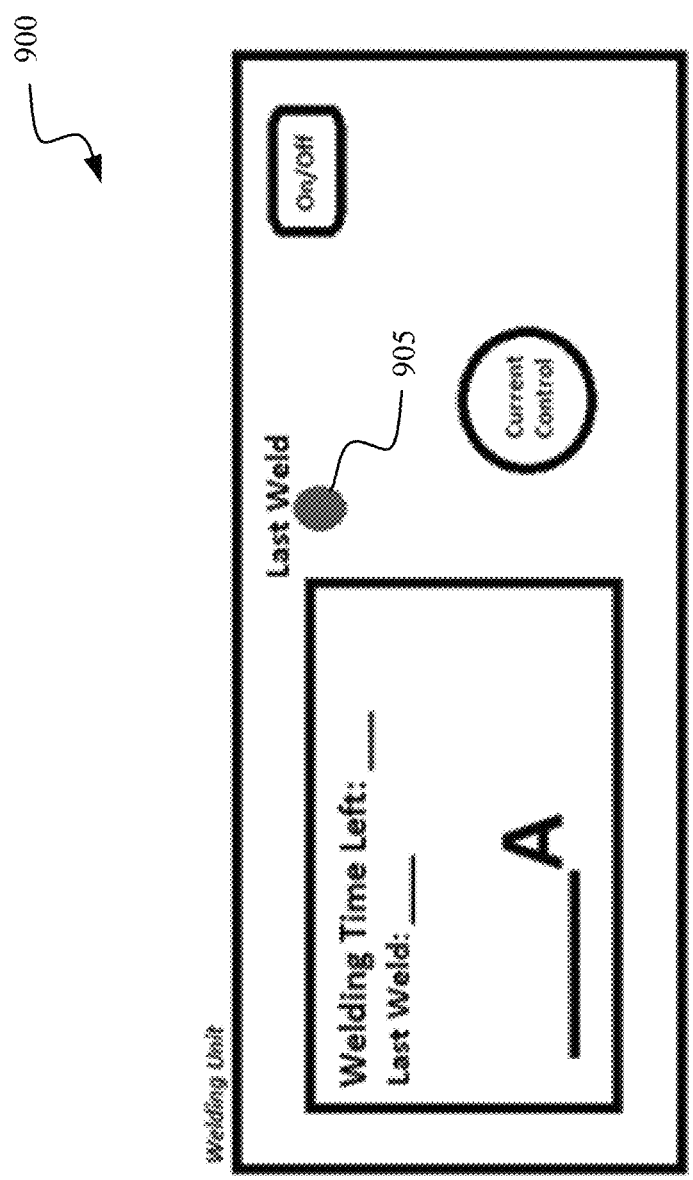
FIG. 9A and FIG. 9B illustrate a last weld indication method for the portable welder of FIG. 1.

FIG. 9A illustrates another embodiment of an interface 900 of the portable welder 100 for displaying a welding current runtime prediction. In some embodiments, the portable welder 100 is capable of calculating how much usable runtime is present for a specific welding current value. The welding current runtime prediction alert warns a user when runtime is below a time threshold (e.g., set by a user). This allows the user to plan the welding task based on a preset runtime. The portable welder takes the calculated time left to weld (as described previously) and compares the value to the threshold set by the user. Once the time left to weld is equal to or below the threshold, the portable welder 100 will provide a visual indication 905 (or, in some embodiments, audible indication) to warn the user through LEDs, LCD screens, or other similar devices.

Figure 9B:
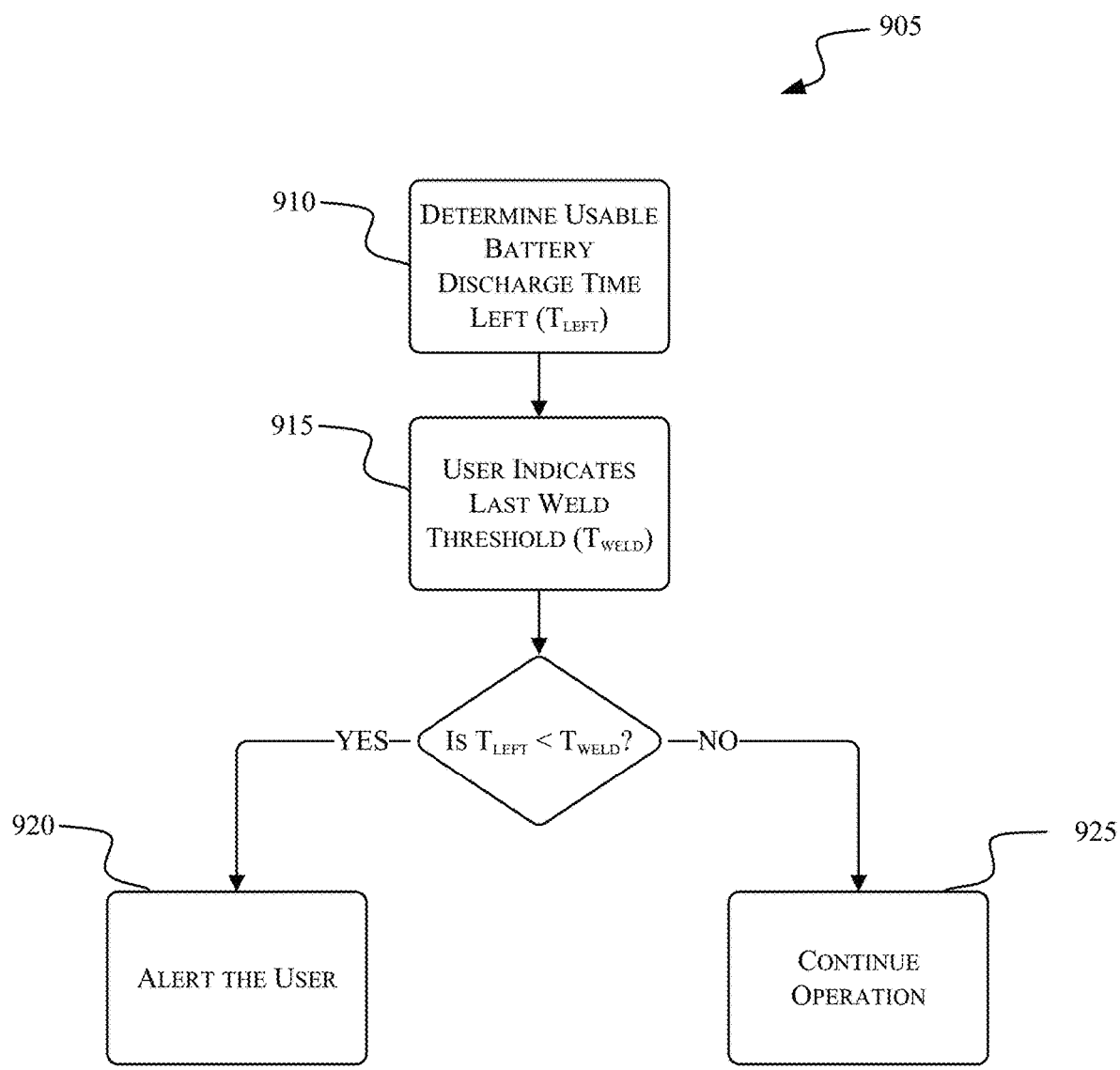

FIG. 9B illustrates a welding current runtime prediction alert method 905 implemented by the portable welder 100. The portable welder 100 first determines the amount of usable battery discharge time left (STEP 910), and a user indicates the welding threshold time value for completing an action taken using the portable welder (STEP 915). The portable welder 100 then determines whether the welding threshold would exceed the time left for the battery pack to be discharged. If this is the case, the portable welder 100 notifies the user of the discrepancy (STEP 920) and that there is insufficient charge on the battery pack to complete to operation. If the welding time of the task is shorter than the time left for battery pack to be discharged, then the portable welder 100 continue operation as normal (STEP 925).

Figure 10A:
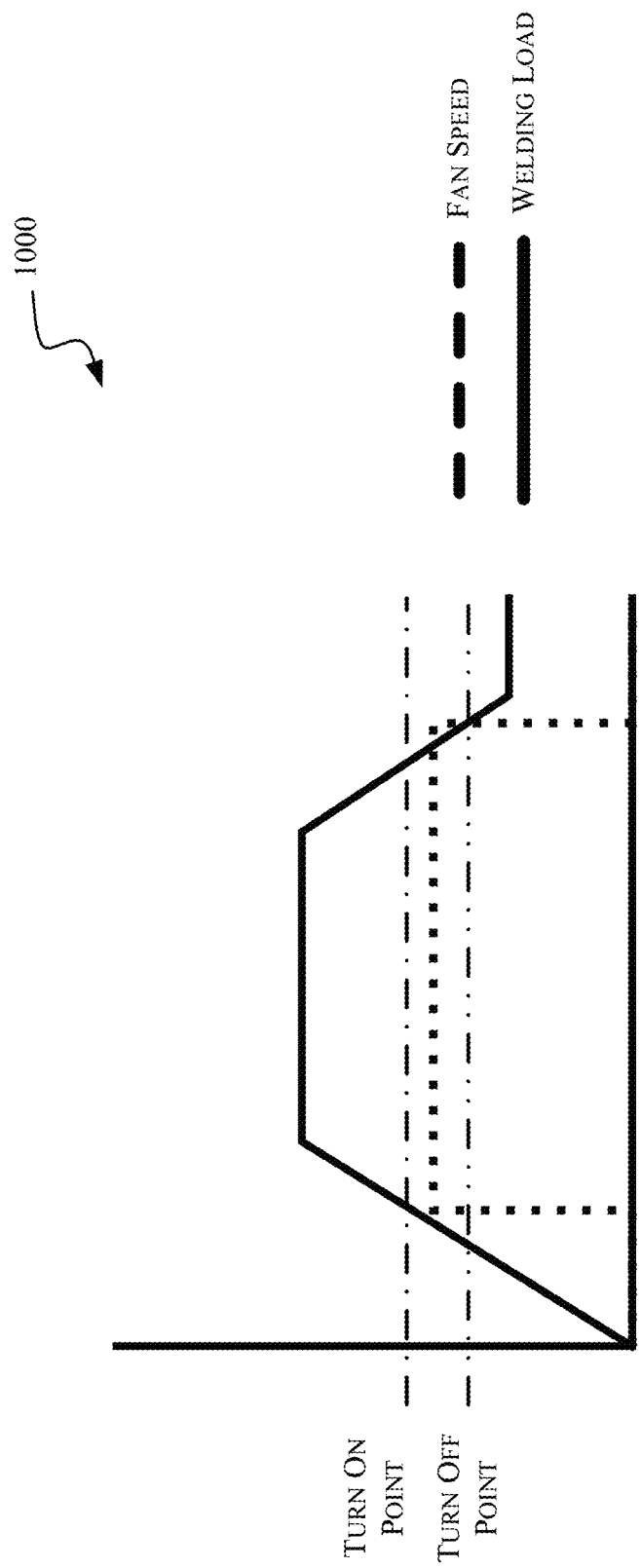
FIG. 10A and FIG. 10B illustrate fan control for the portable welder of FIG. 1.

The portable welder 100 is a high-power application that uses, for example, active cooling (e.g., a fan) of electrical components within the portable welder 100. By controlling a fan's speed, the battery life of the battery pack may be able to be conserved for a longer runtime. Controlling the fan speed and/or turn on time will save power and reduce noise of the portable welder 100. In the embodiment illustrated in FIG. 10A, fan control 1000 will be based on hysteresis. The fan will turn ON when a temperature (or welding load) is read at a value that is above a first set value. The fan will turn OFF once the temperature has reduced below a second set value. The set values may be the same value or different values. As illustrated in FIG. 10A, the first set value is greater than the second set value.

Figure 10B:
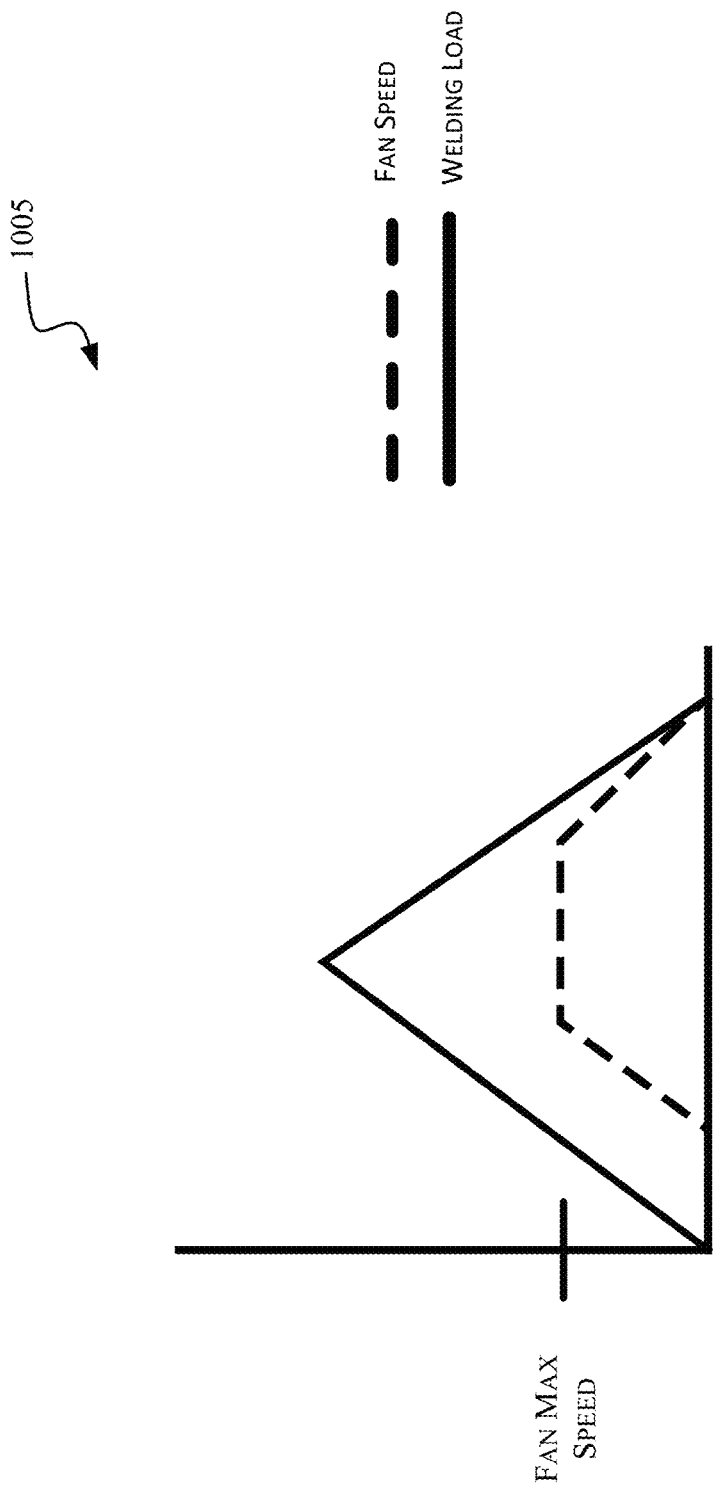

In another embodiment, illustrated in FIG. 10B, fan control 1005 operation is based on a dynamic fan control. The fan will adjust the running speed when an application of the portable welder 100 has started. The speed of the fan will be determined by the portable welder 100's welding load. The higher the load value the faster the fan speed. Once the fan has reached a maximum speed, the system will remain on before reducing the fan speed if the load is reduced. In some embodiments, existing heat generated in the portable welder 100 can be considered after the fan reaches maximum speed to determine whether the portable welder 100 should be disabled.

Thus, embodiments described herein provide, among other things, systems and methods for a portable welder. Various features and advantages are set forth in the following claims.

What is claimed is:

1. A portable welder comprising:
a portable housing;
a ground clamp connected to the portable housing through a ground cable, the ground clamp configured to be connected to a metal workpiece;
an electrode holder connected to the portable housing through an electrode cable, the electrode holder including a mount connected to the electrode cable, the mount configured to hold a consumable electrode, and
a user input configured to activate the portable welder;
a user interface located on the housing;
a battery pack interface configured to receive a removable and rechargeable battery pack; and
a wireless communication controller configured to wirelessly communicate with an external device separate from the portable welder,
wherein a setting of the portable welder is controlled based on a signal received from the external device.

2. The portable welder of claim 1, wherein the user interface displays a state-of-charge of the battery pack.

3. The portable welder of claim 1, wherein the setting of the portable welder is an ON or OFF state of a security lockout system.

4. The portable welder of claim 1, wherein the portable welder is configured to be powered by between a 200 Watt-hour battery pack and a 1000 Watt-hour battery pack.

5. The portable welder of claim 4, wherein the portable welder controls operation of a fan based on a temperature associated with the portable welder.

6. The portable welder of claim 5, wherein the fan of the portable welder is controlled to turn ON based on a first temperature threshold and to turn OFF based on a second temperature threshold.

7. A portable welder comprising:
a portable housing;
an electrode holder connected to the housing through an electrode cable, the electrode holder including:
a consumable electrode;
a mount connected to the electrode cable, the mount configured to hold the consumable electrode, and
a user input configured to activate the portable welder;
a user interface located on the housing;
a battery pack interface configured to receive a removable and rechargeable battery pack; and
a wireless communication controller configured to wirelessly communicate with an external device separate from the portable welder,
wherein a setting of the portable welder is controlled based on a signal from the external device.

8. The portable welder of claim 7, wherein the user interface displays a state-of-charge of the battery pack.

9. The portable welder of claim 7, wherein the setting of the portable welder is an ON or OFF state of a security lockout system.

10. The portable welder of claim 7, wherein the portable welder is configured to be powered by between a 200 Watt-hour battery pack and a 1000 Watt-hour battery pack.

11. The portable welder of claim 7, wherein the portable welder controls operation of a fan based on a temperature associated with the portable welder.

12. The portable welder of claim 11, wherein the fan of the portable welder is controlled to turn ON based on a first temperature threshold and to turn OFF based on a second temperature threshold.

13. The portable welder of claim 12, wherein the first temperature threshold is different from the second temperature threshold.

14. The portable welder of claim 7, wherein the portable welder determines a remaining runtime of the portable welder based on a state-of-charge of the battery pack.

15. A portable welder comprising:
a portable housing;
an electrode holder connected to the housing through an electrode cable, the electrode holder including:
a consumable electrode;
a mount connected to the electrode cable, the mount configured to hold the consumable electrode, and
a user input configured to activate the portable welder;
a user interface located on the housing;
a battery pack interface configured to receive a removable and rechargeable battery pack; and
a wireless communication controller configured to wirelessly communicate with an external device separate from the portable welder.

16. The portable welder of claim 15, wherein a setting of the portable welder is controlled based on a signal from the external device.

17. The portable welder of claim 16, wherein the setting of the portable welder is an ON or OFF state of a security lockout system.

18. The portable welder of claim 15, wherein the portable welder is configured to be powered by between a 200 Watt-hour battery pack and a 1000 Watt-hour battery pack.

* * * * *